United States Patent
Yokoyama et al.

(10) Patent No.: US 12,221,497 B2
(45) Date of Patent: Feb. 11, 2025

(54) POLYETHYLENE POWDER, AND MOLDED BODY THEREOF

(71) Applicant: Asahi Kasei Kabushiki Kaisha, Tokyo (JP)

(72) Inventors: Haruka Yokoyama, Tokyo (JP); Kazuya Shikata, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/573,786

(22) PCT Filed: Jun. 23, 2022

(86) PCT No.: PCT/JP2022/025030
§ 371 (c)(1),
(2) Date: Dec. 22, 2023

(87) PCT Pub. No.: WO2022/270571
PCT Pub. Date: Dec. 29, 2022

(65) Prior Publication Data
US 2024/0239926 A1    Jul. 18, 2024

(30) Foreign Application Priority Data

Jun. 25, 2021   (JP) .................................. 2021-105354

(51) Int. Cl.
*C08F 10/02*         (2006.01)
*H01M 50/406*     (2021.01)
*H01M 50/417*     (2021.01)

(52) U.S. Cl.
CPC ........... *C08F 10/02* (2013.01); *H01M 50/406* (2021.01); *H01M 50/417* (2021.01)

(58) Field of Classification Search
CPC .............. C08F 2500/01; C08F 2500/17; C08F 2500/24
See application file for complete search history.

(56) References Cited

U.S. PATENT DOCUMENTS

2017/0092920 A1   3/2017  Matsumoto et al.
2019/0359740 A1   11/2019 Tanaka
(Continued)

FOREIGN PATENT DOCUMENTS

EP       3366708 A1      8/2018
JP       H02-021559 A    1/1990
(Continued)

OTHER PUBLICATIONS

Translation WO 2020189443 A1 (Year: 2020).*
(Continued)

*Primary Examiner* — Hoa (Holly) Le
(74) *Attorney, Agent, or Firm* — Morgan, Lewis & Bockius LLP

(57) ABSTRACT

A polyethylene powder having a viscosity-average molecular weight of 200,000 or more and 10,000,000 or less, wherein complex viscosity under predetermined conditions for measurement of slurry viscoelasticity satisfies the following formula (1): $-25.0\times10^{-4} \leq$ $$\{|\eta^*|(T_{max}) - |\eta^*|(T_{min})\}/(T_{max} - T_{min}) \leq -5.0\times10^4 \quad (1)$$

($|\eta^*|(T_{max})$: an absolute value of complex viscosity (Pas) at $T_{max}$, ($T_{min}$): an absolute value of complex viscosity (Pas) at $T_{min}$, $T_{max}$: maximum temperature (° C.) within a range in which the formula (2) is satisfied, $T_{min}$: minimum temperature (° C.) within a range in which the formula (2)) is satisfied: $d(\log|\eta^*|)/dT \leq -0.1$ (2) ($|\eta^*|$: an absolute value of complex viscosity (Pas), T: temperature).

20 Claims, 2 Drawing Sheets

(56) References Cited

U.S. PATENT DOCUMENTS

| | | |
|---|---|---|
| 2020/0399460 A1 | 12/2020 | Plamthottam |
| 2021/0017363 A1 | 1/2021 | Tsujimoto |
| 2021/0032446 A1 | 2/2021 | Tanaka |
| 2023/0056794 A1* | 2/2023 | Shikata .................. C08F 110/02 |
| 2023/0279203 A1* | 9/2023 | Shikata .................. C08L 23/06 |
| | | 524/240 |

FOREIGN PATENT DOCUMENTS

| | | |
|---|---|---|
| JP | 2011-241361 A | 12/2011 |
| JP | 5876632 B1 | 3/2016 |
| JP | 2018-095862 A | 6/2018 |
| WO | 2018/143191 A1 | 8/2018 |
| WO | 2019/187727 A1 | 10/2019 |
| WO | 2019/207991 A1 | 10/2019 |
| WO | WO-2020189443 A1 * | 9/2020 |
| WO | 2021/153520 A1 | 8/2021 |

OTHER PUBLICATIONS

International Search Report issued in corresponding International Patent Application No. PCT/JP2022/025030 dated Jul. 26, 2022.
Supplementary European Search Report issued in European Patent Application No. 22828487.3 dated Sep. 18, 2024.

* cited by examiner

POLYETHYLENE POWDER, AND MOLDED BODY THEREOF

TECHNICAL FIELD

The present invention relates to a polyethylene powder, and a molded body thereof.

BACKGROUND ART

Polyethylene is easy to melt-process, and molded bodies of polyethylene have high mechanical strength and are also excellent in chemical resistance, rigidity, and the other properties. Hence, polyethylene has been conventionally used as a material for a wide variety of applications such as films, sheets, microporous membranes, fibers, foams, and pipes.

Particularly, ultrahigh molecular weight polyethylene has higher mechanical strength and is excellent in sliding properties and wear resistance and also excellent in chemical stability and long-term reliability and therefore has high practical applicability.

However, a problem of ultrahigh molecular weight polyethylene powders is that they have low fluidity even if melted at a temperature equal to or more than the melting point. Therefore, as general methods for forming the ultrahigh molecular weight polyethylene, a method involving processing an ultrahigh molecular weight polyethylene powder in a dissolved state in a solvent and then removing the solvent are known, for example.

For example, a method for heat setting is disclosed, the method including adding a solvent such as a liquid paraffin or decalin to an ultrahigh molecular weight polyethylene powder to form a slurry, heating and kneading the slurry by an extruder to form a gel, subjecting the resulting slurry to stretching into the form of a sheet or thread with cooling, reheating the sheet or the thread to the vicinity of the melting point, further performing stretching, and then removing the solvent by, for example, extraction (see, for example, Patent Document 1).

Microporous membranes formed by using polyethylene powders are used as materials for batteries. In recent years, for the purpose of achieving downsizing, larger capacity, and higher power of batteries, even thinner films have been required for such microporous membranes. Hence, various techniques intended for higher strength associated with such thinner microporous membranes have been disclosed (see, for example, Patent Document 2 and Patent Document 3).

For example, Patent Document 4 proposes a polyethylene powder that provides a molded body being excellent in processability, having high mechanical strength, and having small decrease in strength when repetitively heated.

LIST OF PRIOR ART DOCUMENTS

Patent Document

Patent Document 1: Japanese Patent Laid-Open No. 2-21559

Patent Document 2: Japanese Patent Laid-Open No. 2011-241361

Patent Document 3: Japanese Patent No. 5876632

Patent Document 4: International Publication No. WO 2020/189443

SUMMARY OF INVENTION

Problems to be Solved by Invention

Generally, as methods for enhancing the strength of a microporous membrane, a method involving increasing the molecular weight of polyethylene used as a starting material and a method involving increasing the stretching ratio are known, for example. For example, the polyethylene powder described in Patent Document 4 can form a gel that tends to have small entanglement of molecular chains, and therefore forms microporous membranes with increased puncture strength by a method involving increasing the stretching ratio.

However, for performing high-ratio stretching, it is necessary to thicken a gel sheet before stretching. This tends to cause variations in the degree of heat propagation in the membrane thickness direction during cooling and during stretching. Hence, nonuniform micropores are formed and might deteriorate the quality of the resulting microporous membrane. In biaxial stretching, the setting range of the stretching ratio is narrow in view of the situation of equipment, and the stretching ratio is difficult to increase. Low-ratio stretching tends to fail to achieve higher strength of microporous membranes.

The production of microporous membranes includes the step of cooling a gel sheet by contact with a roll after sheet formation for the purpose of crystallizing the gel sheet in order to sandwich the sheet between chucks of stretching equipment. If the gel sheet is released in an insufficiently crystallized state from the roll, asperities occur on sheet surface because a portion of the gel sheet falls off and adheres onto the roll. For example, the polyethylene powder described in Patent Document 4 is slowly crystallized, and therefore requires prolonging a cooling time (roll contact time) for producing microporous membranes by such a method and is susceptible to improvement in processing efficiency.

In a lithium ion battery, the heat shrinkage of a microporous membrane might bring electrode ends into contact with each other and cause electrical shorting when the battery body abnormally generates heat. Therefore, the microporous membrane is required to have a low shrinkage rate. In general, the heat shrinkage rate increases with increase in the strength of the microporous membrane. It is therefore desired to achieve both the strength and the heat shrinkage rate.

In view of the situation described above, it is an object of the present invention to provide a polyethylene powder that forms a gel sheet to be released from a cooling roll in a short time, and provides a molded body having high mechanical strength even by low-ratio stretching and further having a low heat shrinkage rate.

Means for Solving Problems

As a result of diligently studies to solve the problems, the present inventors have found that a polyethylene powder having a predetermined slope in complex viscosity change in the process of temperature decrease determined by predetermined conditions for measurement of slurry viscoelasticity can solve the problems, and has completed the present invention.

Specifically, the present invention is as follows.

[1]

A polyethylene powder having a viscosity-average molecular weight of 200,000 or more and 10,000,000 or less, wherein
complex viscosity in step 3 under the following Conditions for Measurement of Slurry Viscoelasticity Satisfies the Following Formula (1):

$$-25.0 \times 10^4 \le \{ |\eta^*| \ (T_{max}) - |\eta^*| \ (T_{min}) \}/(T_{max} - T_{min}) \le -5.0 \times 10^4 \quad (1)$$

$|\eta^*|(T_{max})$: an absolute value of complex viscosity (Pas) at $T_{max}$
$|\eta^*|(T_{min})$: an absolute value of complex viscosity (Pas) at $T_{min}$
$T_{max}$: maximum temperature (° C.) within a range in which the formula (2) is satisfied
$T_{min}$: minimum temperature (° C.) within a range in which the formula (2) is satisfied:

$$d \ (\log |\eta^*| \ )/dT \le -0.1 \quad (2)$$

$|\eta^*|$: an absolute value of complex viscosity (Pas), T: temperature (° C.)
(Conditions for Measurement of Slurry Viscoelasticity)
measuring apparatus: MARS III manufactured by Thermo Fisher Scientific K.K.
stage: 20 mm ϕ
plate: 20 mm ϕ parallel plate
gap: 0.5 mm
slurry composition: 30 parts by mass of a polyethylene powder, 70 parts by mass of a liquid paraffin
polyethylene powder: a powder passing through a sieve having an opening of 425 µm in accordance with a JIS Z 8801 standard is used for measurement
measurement conditions: complex viscosity is measured by the following steps 1 to 3:
step 1 a slurry is kept at 100° C. for 2 min
step 2 after the step 1, temperature is increased from 100° C. to 140° C. at 1° C./min (at a frequency of 1 Hz and a strain of 0.1% under a nitrogen atmosphere)
step 3 after the step 2, temperature is decreased from 140° C. to 100° C. at 1° C./min (at a frequency of 1 Hz and a strain of 0.1% under a nitrogen atmosphere), and complex viscosity with respect to temperature change is measured every 0.5° C.

[2]

The polyethylene powder according to [1], wherein the maximum temperature $T_{max}$ within a range in which the formula (2) is satisfied is 118° C. or more and 121° C. or less.

[3]

The polyethylene powder according to [1] or [2], wherein the absolute value $|\eta^*|$ of complex viscosity when the value of $d(\log|\eta^*|)/dT$ is a minimum value is $5 \times 10^4$ Pas or more and $20 \times 10^4$ Pas or less.

[4]

The polyethylene powder according to any of [1] to [3], wherein the polyethylene powder has an average particle diameter (D50) of 50 µm or more and 300 µm or less.

[5]

The polyethylene powder according to any of [1] to [4], wherein the polyethylene powder is an ethylene homopolymer.

[6]

The polyethylene powder according to any of [1] to [5], wherein a total content of Ti, Al, and Mg is 40 ppm or less.

[7]

The polyethylene powder according to any of [1] to [6], wherein the complex viscosity in step 3 under the Conditions for Measurement of Slurry Viscoelasticity satisfies the following formula (3):

$$\{ |\eta^*| \ (T_{max}) - |\eta^*| \ (T_{min}) \}/(T_{max} - T_{min}) \le 0.74 \log \ (Mv) - 8.2 \quad (3)$$

wherein Mv represents the viscosity-average molecular weight,
$|\eta^*|(T_{max})$: an absolute value of complex viscosity (Pas) at $T_{max}$
$|\eta^*|(T_{min})$: an absolute value of complex viscosity (Pas) at $T_{min}$
$T_{max}$: maximum temperature (° C.) within a range in which the formula (2) is satisfied
$T_{min}$: minimum temperature (° C.) within a range in which the formula (2) is satisfied:

$$d \ (\log |\eta^*| \ )/dT \le -0.1 \quad (2)$$

$|\eta^*|$: an absolute value of complex viscosity (Pas), T: temperature (° C.).

[8]

A molded body of the polyethylene powder according to any of [1] to [7].

[9]

The molded body according to [8], wherein the molded body is a separator for a secondary battery.

[10]

The molded body according to [8] or [9], wherein the molded body is a separator for a lithium ion secondary battery.

Advantages of Invention

According to the present invention, it is possible to provide a polyethylene powder that forms a gel sheet to be released from a cooling roll in a short time, and provides a molded body having high mechanical strength even by low-ratio stretching and further having a low heat shrinkage rate.

MODE FOR CARRYING OUT INVENTION

Figure 1:
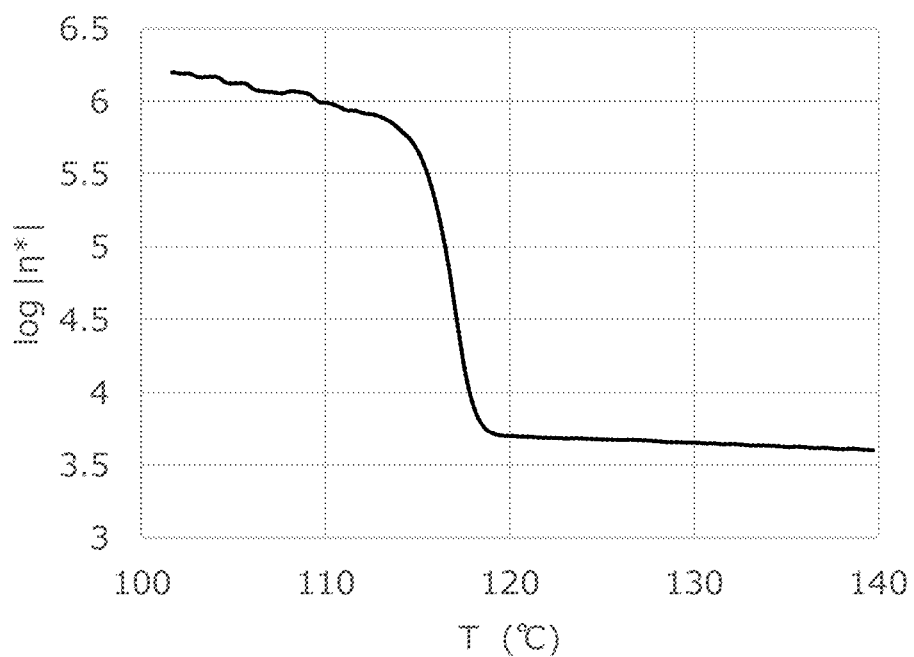
FIG. 1 shows a conceptual diagram of an example of change in complex viscosity with respect to temperature change.

A mode for carrying out the present invention (hereinafter also referred to as the "present embodiment") will be described in detail below.

The present embodiment below is an illustration for describing the present invention and is not intended to limit the present invention to the following contents. Various modifications can be made to the present invention without departing from the spirit thereof.

[Polyethylene Powder]

The polyethylene powder of the present embodiment has a viscosity-average molecular weight of 200,000 or more and 10,000,000 or less, and complex viscosity in step 3 under the following Conditions for Measurement of Slurry Viscoelasticity Satisfies the Following Formula (1):

$$-25.0 \times 10^4 \leq \{ |\eta^*| (T_{max}) - |\eta^*| (T_{min}) \}/(T_{max} - T_{min}) \leq -5.0 \times 10^4 \quad (1)$$

$|\eta^*|(T_{max})$: an absolute value of complex viscosity (Pas) at $T_{max}$ $|\eta^*|(T_{min})$: an absolute value of complex viscosity (Pas) at $T_{min}$ $T_{max}$: maximum temperature (° C.) within a range in which the following formula (2) is satisfied $T_{min}$: minimum temperature (° C.) within a range in which the following formula (2) is satisfied:

$$d (\log |\eta^*|)/dT \leq -0.1 \quad (2)$$

$|\eta^*|$: an absolute value of complex viscosity (Pas), T: temperature (° C.)

(Conditions for Measurement of Slurry Viscoelasticity)

measuring apparatus: MARS III manufactured by Thermo Fisher Scientific K.K.

stage: 20 mm φ plate: 20 mm φ parallel plate gap: 0.5 mm slurry composition: 30 parts by mass of a polyethylene powder, 70 parts by mass of a liquid paraffin polyethylene powder: a powder passing through a sieve having an opening of 425 μm in accordance with a JIS Z 8801 standard is used for measurement measurement conditions: complex viscosity is measured by the following steps 1 to 3:

step 1 a slurry is kept at 100° C. for 2 min step 2 after the step 1, temperature is increased from 100° C. to 140° C. at 1° C./min (at a frequency of 1 Hz and a strain of 0.1% under a nitrogen atmosphere)

step 3 after the step 2, temperature is decreased from 140° C. to 100° C. at 1° C./min (at a frequency of 1 Hz and a strain of 0.1% under a nitrogen atmosphere), and complex viscosity with respect to temperature change is measured every 0.5° C.

The polyethylene powder of the present embodiment having the above configuration exhibits the effect of forming a gel sheet to be released from a cooling roll in a short time, and providing a molded body having high mechanical strength even by low-ratio stretching and further having a low heat shrinkage rate.

The configuration of the polyethylene powder of the present embodiment will be described below.

The polyethylene powder of the present embodiment is composed of an ethylene polymer. In the ethylene polymer, preferably 99.5 mol % or more and more preferably 99.8 mol % or more of the constituent units are ethylene units, and further preferably 100 mol % of the constituent units are ethylene units (ethylene homopolymer).

For the purpose of improving the processability and improving the creep characteristics of a fiber when the fiber is produced as a molded body of the polyethylene powder, a very small amount of a copolymerizable component such as an α-olefin can also be added to the ethylene polymer to introduce a branch.

When the copolymerizable component of the ethylene polymer is less than 0.3 mol %, reduction in the degree of molecular orientation of a molded body after stretching, which is due to branched chains, is prevented, and the mechanical strength increases.

The copolymerizable component when the ethylene polymer is a copolymer is not particularly limited, and examples thereof include α-olefins and vinyl compounds.

Examples of the α-olefins include, but are not limited to, α-olefins having 3 to 20 carbon atoms, specifically, but are not particularly limited to, propylene, 1-butene, 4-methyl-1-pentene, 1-hexene, 1-octene, 1-nonene, 1-decene, 1-undecene, 1-dodecene, 1-tridecene, and 1-tetradecene.

Examples of the vinyl compounds include, but are not limited to, vinylcyclohexane, styrene, and derivatives thereof.

A nonconjugated polyene such as 1,5-hexadiene or 1,7-octadiene can also be used as another comonomer, as needed.

Only one copolymerizable component may be used alone, or two or more copolymerizable components may be used in combination.

The amount of another comonomer in the copolymer when the ethylene polymer is the copolymer can be confirmed by an NMR method or the like.

The density of the polyethylene powder of the present embodiment is not particularly limited but is preferably 910 kg/m³ or more and 980 kg/m³ or less, more preferably 915 kg/m³ or more and 970 kg/m³ or less, and further preferably 920 kg/m³ or more and 965 kg/m³ or less.

When the density of the polyethylene powder of the present embodiment is 910 kg/m³ or more and 980 kg/m³ or less, a stretched molded body, a microporous membrane, and a fiber including the polyethylene powder of the present embodiment has excellent strength. The density of the polyethylene powder can be measured by a method described in Examples described later.

$$( \{ |\eta^*| (T_{max}) - |\eta^*| (T_{min}) \}/(T_{max} - T_{min}) ),$$

$$d (\log |\eta^*|)/dT, |\eta^*| (T_{max}), |\eta^*| (T_{min}), T_{max}, T_{min} )$$

A slurry solution of 30 parts by mass of the polyethylene powder of the present embodiment and 70 parts by mass of a liquid paraffin is prepared, and the complex viscosity with respect to temperature change is measured under the (Conditions for Measurement of Slurry Viscoelasticity). As a result, for example, a curve as shown in FIG. 1 (hereinafter referred to as a complex viscosity change curve) is obtained.

Figure 2:
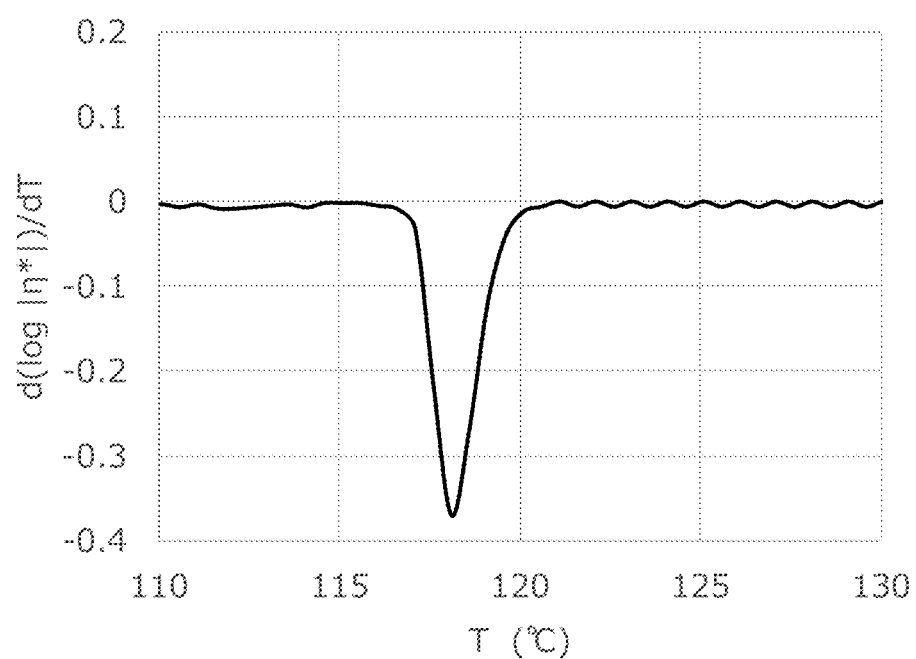
FIG. 2 shows a conceptual diagram of an example of the measurement results of "$d(\log|\eta^*|)/dT$," which represents the degree of complex viscosity change with respect to temperature change.

When the complex viscosity change curve shown in FIG. 1 is converted to the degree of complex viscosity change with respect to temperature change, that is, "$d(\log|\eta^*|)/dT$", a curve as shown in FIG. 2 is obtained, for example.

The peak portion of $d(\log|\eta^*|)/dT$ corresponds to the process of increase in complex viscosity in the complex viscosity change curve. This process of increase is due to decrease in the mobility of molecular chains associated with the crystallization of polyethylene, and a more negative slope of the complex viscosity change curve indicates a larger movement termination rate, that is, a larger crystallization rate, of molecular chains.

The amplitude of the crystallization rate of molecular chains is influenced by the degree of dispersion of the polyethylene molecular chains in the liquid paraffin. When the polyethylene molecular chains are low dispersible in the solvent, the crystallization rate is large because the polyethylene molecular chains in the solvent are entangled to interfere with each other.

In the present embodiment, the slope of the process of increase in complex viscosity, which represents the movement termination rate of molecular chains, is represented by the formula $\{|\eta^*|(T_{max}) - |\eta^*|(T_{min})\}/(T_{max} - T_{min})$ wherein used is maximum temperature $T_{max}$ and minimum temperature $T_{min}$, and absolute values $|\eta^*|(T_{max})$ and $|\eta^*|(T_{min})$ of complex viscosity at $T_{max}$ and $T_{min}$. The maximum temperature $T_{max}$ and minimum temperature $T_{min}$ are determined from the range of temperatures at which the formula (2) is satisfied, among temperatures at which "d(log$|\eta^*|$)/dT" is negative value. "d(log$|\eta^*|$)/dT" represents the degree of complex viscosity change with respect to temperature change. The formula (2) indicates that "d(log$|\eta^*|$)/dT" is negative value, provided that measurement errors are taken into consideration.

In the polyethylene powder of the present embodiment, $\{|\eta^*|(T_{max}) - |\eta^*|(T_{min})\}/(T_{max} - T_{min})$ is $-25.0 \times 10^4$ Pas/° C. or more and $-5.0 \times 10^4$ Pas/° C. or less, preferably $-20.0 \times 10^4$ Pas/° C. or more and $-7.5 \times 10^4$ Pas/° C. or less, more preferably $-14.0 \times 10^4$ Pas/° C. or more and $-8.0 \times 10^4$ Pas/° C. or less, and further preferably $-12.0 \times 10^4$ Pas/° C. or more and $-10.0 \times 10^4$ Pas/° C. or less.

When $\{|\eta^*|(T_{max}) - |\eta^*|(T_{min})\}/(T_{max} - T_{min})$ is $-5.0 \times 10^4$ Pas/° C. or less, the polyethylene powder of the present embodiment is low dispersible in the liquid paraffin in the process of dissolution, and it is considered that the polyethylene powder moderately has an insufficiently relaxed portion and an entangled portion of molecular chains. It is considered that since this entangled portion acts as a nucleating agent in the process of crystallization, the polyethylene powder of the present embodiment is crystallized in a short time.

For example, in the formation of a microporous membrane using the polyethylene powder of the present embodiment, a gel sheet formed with a die of an extruder is rapidly crystallized upon contact with a cooling roll and therefore easily released from the cooling roll even if the contact time with the cooling roll is short. Thus, partial elimination of the gel can be prevented. Since an eliminated portion renders a sheet thickness nonuniform and is responsible for nonuniform physical properties such as membrane permeability or strength, it is necessary for a slowly crystallized gel to prolong a cooling time. Nonetheless, the polyethylene powder of the present embodiment is capable of being molded at a high speed because the crystallization rate of a gel is fast.

When the polyethylene powder of the present embodiment is used, stretching stress is easily applied due to the presence of the entangled portion in a gel stretching step. Therefore, a fibril portion having a high degree of orientation is formed even at a low stretching ratio, and the resulting molded body has high strength.

On the other hand, when $\{|\eta^*|(T_{max}) - |\eta^*|(T_{min})\}/(T_{max} - T_{min})$ is $-25.0 \times 10^4$ Pas/° C. or more, the polyethylene powder of the present embodiment lacks an entangled portion sufficient for increasing a heat shrinkage rate, and has a low heat shrinkage rate.

Although the method for controlling $\{|\eta^*|(T_{max}) - |\eta^*|(T_{min})\}/(T_{max} - T_{min})$ to a predetermined value is not particularly limited, a possible method includes, for example, enhancing the entanglement of molecular chains by increasing the initial activity of polymerization to thereby perform rapid polymerization.

Specific examples of the method for enhancing the entanglement of polyethylene molecular chains include, but are not limited to, a method involving carrying out at least three of the following methods (1) to (4) in a polyethylene powder production process.

(1) A method involving supplying ethylene gas and a catalyst (and a promoter, if necessary) from adjacent pipes into a slurry in a polymerization reactor, and in the case of supplying hydrogen gas, supplying the hydrogen gas to a gas phase in the polymerization reactor.

(2) A method involving adjusting a solvent (for example, hexane) in which ethylene gas is dissolved to 40° C. to 50° C., followed by supply into a polymerization reactor.

(3) A method involving bringing a catalyst into contact with a promoter, and adjusting the resultant to 40° C. to 50° C., followed by supply into a polymerization reactor.

(4) A method involving increasing the active site density of a catalyst.

When at least three of the methods (1) to (4) are carried out, adjacent molecular chains of the polyethylene powder of the present embodiment get entangled moderately at the early stage of polymerization, and the polyethylene powder maintains the entanglement of the molecular chains exhibiting a nucleating agent effect even when melted in a solvent such as a liquid paraffin. In the case of supplying hydrogen gas in the method (1), the hydrogen gas is supplied to a gas phase in the polymerization reactor for the purpose of preventing a high concentration of hydrogen serving as the reaction terminator when the hydrogen is brought into contact with the catalyst so as not to inhibit rapid polymerization. Thus, when no hydrogen gas is supplied, the inhibition of rapid polymerization by the hydrogen serving as the reaction terminator does not occur. Therefore, the method (1) is regarded as being carried out by merely supplying ethylene gas and a catalyst from adjacent pipes into a slurry in a polymerization reactor.

In the polyethylene powder of the present embodiment, the complex viscosity in step 3 under the Conditions for Measurement of Slurry Viscoelasticity preferably satisfies the following formula (3):

$$\{|\eta^*|(T_{max}) - |\eta^*|(T_{min})\}/(T_{max} - T_{min}) \leq 0.74\log(Mv) - 8.2 \quad (3)$$

In this context, Mv is the viscosity-average molecular weight.

The left-hand member of the formula (3) is an index for the crystallization rate as described above. In general, the crystallization rate is slowed down with increase in molecular weight. Hence, when the polyethylene powder has a crystallization rate that satisfies the formula (3) with respect to the molecular weight, the release properties from a cooling roll and the strength and heat shrinkage rate of a molded body tend to be better. Although the method for controlling $\{|\eta^*|(T_{max}) - |\eta^*|(T_{min})\}/(T_{max} - T_{min})$ so as to satisfy the formula (3) is not particularly limited, a possible method includes enhancing the entanglement of molecular chains. The specific method for enhancing the entanglement of molecular chains is as described above.

(Viscosity-Average Molecular Weight (Mv))

The viscosity-average molecular weight (Mv) of the polyethylene powder of the present embodiment is 200,000 or more and 10,000,000 or less, preferably 250,000 or more and 6,000,000 or less, more preferably 300,000 or more and 1,500,000 or less, and further preferably 500,000 or more and 1,200,000 or less.

When the viscosity-average molecular weight (Mv) of the polyethylene powder is 200,000 or more, the mechanical strength of a molded body increases. When the viscosity-average molecular weight (Mv) of the polyethylene powder is 10,000,000 or less, a gel state with a solvent (for example, a liquid paraffin) exhibits good stretchability and has excellent processability.

The viscosity-average molecular weight (Mv) of the polyethylene powder can be controlled in the numerical value range by, for example, but not particularly limited to, using catalysts described later and appropriately adjusting the polymerization conditions and the others.

As for the polymerization conditions, specifically, hydrogen is allowed to be present in the polymerization system, or the polymerization pressure and/or the polymerization temperature is changed, for example. Thus, the viscosity-average molecular weight can be controlled.

The viscosity-average molecular weight (Mv) can be measured by a method described in Examples described later.

(Maximum Temperature at which $d(\text{Log}|\eta^*|)/dT$ is $-0.1$ or Less)

The maximum temperature $T_{max}$ within a range in which the formula (2) is satisfied, that is, the maximum temperature at which $d(\log|\eta^*|)/dT$ is $-0.1$ or less, is preferably 118° C. or more and 121° C. or less, more preferably 119° C. or more and 121° C. or less, and further preferably 119.5° C. or more and 121° C. or less.

When the maximum temperature at which $d(\log|\eta^*|)/dT$ is $-0.1$ or less is 121° C. or less, the polyethylene powder of the present embodiment tends to be able to be more easily molded.

For example, in the formation of a microporous membrane using the polyethylene powder of the present embodiment, stretching is easily performed because the crystallization onset temperature is not too high in the step of heating and stretching a gel sheet.

When the maximum temperature at which $d(\log|\eta^*|)/dT$ is $-0.1$ or less is 118° C. or more, there is a tendency that the crystallization of the polyethylene powder of the present embodiment is started even if brought into contact with a cooling roll for a short time and that thus a gel sheet is more easily released from the cooling roll.

The method for controlling the maximum temperature at which $d(\log|\eta^*|)/dT$ is $-0.1$ or less so as to be within the above-described range is not particularly limited but includes, for example, performing the following methods in combination in a polyethylene powder production process: (1) a method involving supplying ethylene gas and a catalyst (and a promoter, if necessary) from adjacent pipes into a slurry in a polymerization reactor, and in the case of supplying hydrogen gas, supplying the hydrogen gas to a gas phase in the polymerization reactor; (2) a method involving adjusting a solvent (for example, hexane) in which ethylene gas is dissolved to 40° C. to 50° C., followed by supply into a polymerization reactor; (3) a method involving bringing a catalyst into contact with a promoter, and adjusting the resultant to 40° C. to 50° C., followed by supply into a polymerization reactor; and (4) a method involving increasing the active site density of a catalyst.

(Absolute Value $|\eta^*|$ of Complex Viscosity when Value of $d(\text{Log}|\eta^*|)/dT$ is Minimum Value)

The absolute value $|\eta^*|$ of complex viscosity of the polyethylene powder of the present embodiment when the value of $d(\log|\eta^*|)/dT$ is a minimum value is preferably $5.0\times10^4$ Pas or more and $20\times10^4$ Pas or less, more preferably $5.0\times10^4$ Pas or more and $14.0\times10^4$ Pas or less, and further preferably $6.0\times10^4$ Pas or more and $9.0\times10^4$ Pas or less.

When the absolute value $|\eta^*|$ of complex viscosity of the polyethylene powder of the present embodiment when the value of $d(\log|\eta^*|)/dT$ is a minimum value is $5.0\times10^4$ Pas or more, a gel obtained by melting the polyethylene powder in a solvent (for example, a liquid paraffin) has high entanglement. Therefore, the stretching stress increases even if stretching is performed at a low ratio. The resulting microporous membrane tends to have higher strength.

When the absolute value $|\eta^*|$ of complex viscosity of the polyethylene powder of the present embodiment when the value of $d(\log|\eta^*|)/dT$ is a minimum value is $20.0\times10^4$ Pas or less, too high viscosity can be prevented and the clogging of a die ascribable to decrease in fluidity in an extruder tends to be less likely to occur.

The method for controlling the absolute value $|\eta^*|$ of complex viscosity when the value of $d(\log|\eta^*|)/dT$ is a minimum value to within the range is not particularly limited but includes, for example, performing the following methods in combination in a polyethylene powder production process: (1) a method involving supplying ethylene gas and a catalyst (and a promoter, if necessary) from adjacent pipes into a slurry in a polymerization reactor, and in the case of supplying hydrogen gas, supplying the hydrogen gas to a gas phase in the polymerization reactor; (2) a method involving adjusting a solvent (for example, hexane) in which ethylene gas is dissolved to 40° C. to 50° C., followed by supply into a polymerization reactor; (3) a method involving bringing a catalyst into contact with a promoter, and adjusting the resultant to 40° C. to 50° C., followed by supply into a polymerization reactor; and (4) a method involving increasing the active site density of a catalyst.

(Average Particle Diameter D50)

The average particle diameter (D50) of the polyethylene powder of the present embodiment is preferably 50 μm or more and 300 μm or less, more preferably 60 μm or more and 280 μm or less, and further preferably 70 μm or more and 250 μm or less.

When the average particle diameter (D50) is 50 μm or more, the polyethylene powder of the present embodiment is more superior in handleability and tends to reduce troubles in a molding step.

When average particle diameter (D50) is 300 μm or less, the polyethylene powder of the present embodiment has better melting properties in a solvent (for example, a liquid paraffin), and provides a gel having more uniform molecular chain distribution and higher orientation. Therefore, a molded body excellent in mechanical strength tends to be able to be produced.

The average particle diameter (D50) of the polyethylene powder can be measured by a method described in Examples described later.

The average particle diameter (D50) of the polyethylene particles can be controlled to the above-described numerical value range by appropriately adjusting the conditions (for example, temperature and ethylene pressure) in the polymerization system. Specifically, the average particle diameter (D50) can be increased with increase in polymerization temperature and/or polymerization pressure, and the average particle diameter (D50) can be decreased with decrease in polymerization temperature and/or polymerization pressure.
(Total Content of Ti, Al, and Mg)

In the polyethylene powder of the present embodiment, the total content of titanium (Ti), aluminum (Al), and magnesium (Mg) is preferably 40 ppm or less, more preferably 30 ppm or less, and further preferably 20 ppm or less. The lower limit of the total content of Ti, Al, and Mg is not particularly limited but is, for example, a detection limit value.

In the present embodiment, the total content of Ti, Al, and Mg refers to the amount of catalyst residues.

When the total content of Ti, Al, and Mg is 40 ppm or less, the polyethylene powder of the present embodiment is less likely to cause thermal deterioration when molded at high temperature, and provides a molded body having high mechanical strength.

It is possible to control the total content of Ti, Al, and Mg by adjusting the productivity of the polyethylene powder per unit catalyst.

It is possible to control the productivity of the polyethylene powder by the polymerization temperature, polymerization pressure, and slurry concentration of a reactor for production. Specifically, the method for increasing the productivity of the polyethylene powder of the present embodiment is not particularly limited but includes, for example, increasing the temperature of a polymerization reactor; increasing the polymerization pressure; and increasing the slurry concentration, in the polymerization step.

The catalyst used is not particularly limited. For example, a general Ziegler-Natta catalyst or metallocene catalyst can be used. It is preferable to use a catalyst described later.

The total content of Ti, Al, and Mg in the polyethylene powder of the present embodiment can be measured by a method described in Examples described later.

[Method for Producing Polyethylene Powder]

Examples of the polymerization method in the method for producing the polyethylene powder of the present embodiment include, but are not limited to, a method including (co)polymerizing ethylene or monomers including ethylene by a slurry polymerization method, a gas phase polymerization method, or a solution polymerization method.

Among these, the slurry polymerization method, in which polymerization heat can be efficiently removed, is preferable.

In the slurry polymerization method, an inert hydrocarbon medium can be used as a medium, and the olefin itself can also be used as a medium.

Examples of the inert hydrocarbon medium can include, but are not limited to, aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

The temperature of the polymerization reactor in the method for producing the polyethylene powder of the present embodiment is usually preferably 40° C. or more and 100° C. or less, more preferably 45° C. or more and 95° C. or less, and further preferably 50° C. or more and 90° C. or less.

When the polymerization temperature is 40° C. or more, industrially efficient production tends to be able to be performed. On the other hand, when the polymerization temperature is 100° C. or less, continuously stable operation tends to be able to be performed.

The pressure of the polymerization reactor in the method for producing the polyethylene powder of the present embodiment is usually preferably 0.10 MPa or more and 2.0 MPa or less, more preferably 0.10 MPa or more and 1.5 MPa or less, and further preferably 0.10 MPa or more and 1.0 MPa or less.

The polymerization reaction can be performed by any of batch, semicontinuous, and continuous methods, and particularly, the polymerization is preferably performed by a continuous method.

By continuously supplying ethylene gas, a solvent (for example, hexane), catalysts, and others into the polymerization system and continuously discharging the ethylene gas, the solvent, the catalysts, and others together with the produced polyethylene powder, a partial high temperature state due to a sudden reaction of ethylene can be suppressed, and the interior of the polymerization system tends to be more stabilized.

As described above, although the method for controlling $\{|\eta^*|(T_{max}) - |\eta^*|(T_{min})\}/(T_{max} - T_{min})$ to a predetermined value is not particularly limited, a possible method includes, for example, enhancing the entanglement of molecular chains by increasing the initial activity of polymerization to thereby perform rapid polymerization.

Specific examples thereof include, but are not limited to, a method involving carrying out at least three of the following methods (1) to (4) in a polyethylene powder production process.

(1) A method involving supplying ethylene gas and a catalyst (and a promoter, if necessary) from adjacent pipes into a slurry in a polymerization reactor, and in the case of supplying hydrogen gas, supplying the hydrogen gas to a gas phase in the polymerization reactor.

(2) A method involving adjusting a solvent (for example, hexane) in which ethylene gas is dissolved to 40° C. to 50° C., followed by supply into a polymerization reactor.

(3) A method involving bringing a catalyst into contact with a promoter, and adjusting the resultant to 40° C. to 50° C., followed by supply into a polymerization reactor.

(4) A method involving increasing the active site density of a catalyst.

[Method (1)]

In the method for producing the polyethylene powder of the present embodiment, it is preferable to supply ethylene gas and a catalyst (and a promoter, if necessary) from adjacent pipes into a slurry in a polymerization reactor, and in the case of supplying hydrogen gas, to supply the hydrogen gas to a gas phase. When the pipes for the ethylene gas and for the catalyst (and the promoter, if necessary) are adjacent, a high concentration of the ethylene gas comes into contact with the catalyst in the slurry so that rapidly grown polyethylene molecular chains tend to have strong entanglement. When the reaction terminator hydrogen is introduced into the gas phase, not into the slurry, the contact of hydrogen at a high concentration with the catalyst tends to be able to be prevented.

[Method (2)]

In the method for producing the polyethylene powder of the present embodiment, the supply temperature of a solvent (for example, hexane) in which ethylene gas is dissolved into a polymerization reactor is preferably set to 40° C. or more and 50° C. or less. When the supply temperature is within the range, polyethylene molecular chains grow rapidly and tend to have strong entanglement.

[Method (3)]

In the method for producing the polyethylene powder of the present embodiment, a catalyst and a promoter are preferably brought into contact with each other in a supply line and then supplied into a polymerization reactor. Also, the supply temperature into the polymerization reactor is preferably set to 40° C. or more and 50° C. or less. When the catalyst and the promoter brought into contact with each other are supplied in an activated state to the polymerization reactor at the supply temperature within the above-described range, polyethylene molecular chains tend to have strong entanglement.

[Method (4)]

The catalyst components used for the method for producing the polyethylene powder of the present embodiment preferably have high active site density. When the active site density is high, growing polyethylene molecular chains have close distance therebetween and tend to form strong entanglement. The active site density of the catalyst can be evaluated in terms of, for example, the amount of titanium supported by the catalyst.

Preferred examples of the catalyst components used for the production of the polyethylene powder of the present embodiment include, but are not particularly limited to, Ziegler-Natta catalysts, metallocene catalysts, and Phillips catalysts.

As the Ziegler-Natta catalysts, those described in Japanese Patent No. 5767202 can be preferably used. The metallocene catalysts are not limited to the following, but, for example, those described in Japanese Patent Laid-Open No. 2006-273977 and Japanese Patent No. 4868853 can be preferably used.

A promoter such as triisobutylaluminum or the Tebbe reagent may be included in the catalyst components used for the production method of the polyethylene powder of the present embodiment.

The average particle diameters of the catalysts used in the method for producing the polyethylene powder of the present embodiment are preferably 0.1 μm or more and 20 μm or less, more preferably 0.2 μm or more and 16 μm or less, and further preferably 0.5 μm or more and 12 μm or less.

When the average particle diameters of the catalysts are 0.1 μm or more, the scattering and adhesion of the obtained polyethylene powder tend to be able to be prevented.

When the average particle diameters of the catalysts are 20 μm or less, there is a tendency that too large a polyethylene powder is difficult to produce, which prevents settling of the polyethylene powder in the polymerization system, and the blockage of a line, for example, in a post-treatment process on polyethylene powder.

The particle diameter distributions of the catalysts are preferably as narrow as possible, and fine powder particles and coarse powder particles can be removed by a sieve, centrifugation, or a cyclone.

The method for deactivating the catalysts used for the production of the polyethylene powder is not particularly limited but is preferably carried out after the polyethylene powder is separated from the solvent.

By introducing an agent for deactivating the catalysts after separation from the solvent, the precipitation of the catalyst components and so on dissolved in the solvent can be suppressed, and Ti, Al, and others derived from the catalyst components can be reduced.

Examples of the agent for deactivating the catalyst can include, but are not limited to, oxygen, water, alcohols, glycols, phenols, carbon monoxide, carbon dioxide, ethers, carbonyl compounds, and alkynes.

The molecular weight of the polyethylene powder can be controlled by, for example, allowing hydrogen to be present in the polymerization system, or changing the polymerization temperature, as described in the DE 3127133A.

By adding hydrogen to the polymerization system as a chain transfer agent, the molecular weight of the polyethylene powder is easily controlled in a suitable range.

When hydrogen is added to the polymerization system, the mole fraction of hydrogen is preferably 0 mol % or more and 30 mol % or less, more preferably 0 mol % or more and 25 mol % or less, and further preferably 0 mol % or more and 20 mol % or less.

Examples of the solvent separation method in the method for producing the polyethylene powder of the present embodiment include, but are not particularly limited to, a decantation method, a centrifugation method, and a filter filtration method. In view of the high efficiency of the separation of the polyethylene powder from the solvent, the centrifugation method is preferable.

In the method for producing the polyethylene powder of the present embodiment, a drying step is preferably carried out after separation from the solvent.

The drying temperature in the drying step is usually preferably 50° C. or more and 150° C. or less, more preferably 50° C. or more and 140° C. or less, and further preferably 50° C. or more and 130° C. or less. When the drying temperature is 50° C. or more, efficient drying is possible. On the other hand, when the drying temperature is 150° C. or less, drying in a state in which the aggregation and thermal deterioration of the polyethylene powder are suppressed is possible.

(Additives)

The polyethylene powder of the present embodiment can include, in addition to the components as described above, other known components useful for the production of the polyethylene powder. The polyethylene powder of the present embodiment, for example, may further contain additives such as, but not particularly limited to, a neutralizing agent, an antioxidant, a nucleating agent, and a light stabilizer.

The neutralizing agent is used as a catcher for chlorine included in polyethylene or a fabrication aid, for example. Examples of the neutralizing agent include, but are not limited to, stearates of alkaline earth metals such as calcium, magnesium, and barium.

The content of the neutralizing agent is not particularly limited but is preferably 5,000 ppm or less, more preferably 4,000 ppm or less, and further preferably 3,000 ppm or less based on the total amount of polyethylene.

When the polyethylene powder of the present embodiment is an ethylene polymer obtained by a slurry polymerization method using a metallocene catalyst, it is also possible to exclude the halogen component from the catalyst constituents, and the neutralizing agent need not be used.

Examples of the antioxidant include, but are not limited to, phenol-based antioxidants such as dibutylhydroxytoluene, pentaerythrityl-tetrakis[3-(3,5-di-t-butyl-4-hydroxyphenyl) propionate], and octadecyl-3-(3,5-di-t-butyl-4-hydroxyphenyl) propionate.

The content of the antioxidant is not particularly limited but is preferably 5,000 ppm or less, more preferably 4,000 ppm or less, and further preferably 3,000 ppm or less.

Examples of the nucleating agent include, but are not limited to, cyclohexane-1,2-dicarboxylate.

The content of the nucleating agent is not particularly limited but is preferably 2,000 ppm or less, more preferably 1,000 ppm or less, and further preferably 500 ppm or less based on the total amount of polyethylene.

Examples of the light stabilizer include, but are not limited to, benzotriazole-based light stabilizers such as 2-(5-methyl-2-hydroxyphenyl)benzotriazole and 2-(3-t-butyl-5-methyl-2-hydroxyphenyl)-5-chlorobenzotriazole; and hindered amine-based light stabilizers such as bis(2,2,6,6-tetramethyl-4-piperidine) sebacate and poly[{6-(1,1,3,3-tetramethylbutyl)amino-1,3,5-triazine-2,4-diyl)} {(2,2,6,6-tetramethyl-4-piperidyl)imino}hexamethylene{(2,2,6,6-tetramethyl-4-piperidyl)imino}].

The content of the light stabilizer is not particularly limited but is preferably 5,000 ppm or less, more preferably 4,000 ppm or less, and further preferably 3,000 ppm or less.

The content of the additives included in the polyethylene powder of the present embodiment, for example, can be obtained by extracting the additives in the polyethylene powder by Soxhlet extraction for 6 hours using tetrahydrofuran (THF), and separating the extract by liquid chromatography for quantification.

[Applications]

The polyethylene powder of the present embodiment is characterized in that the polyethylene powder has strong entanglement even if melted in a solvent such as a liquid paraffin, and has a high crystallization rate, and the polyethylene powder can be applied to various applications by various processing methods.

(Molded Body)

A molded body of the polyethylene powder of the present embodiment is excellent in release properties from a cooling roll, has high strength in low-ratio stretching, and also has a low heat shrinkage rate, and therefore the molded body can be particularly preferably used as a microporous membrane.

Examples of such a molded body include, but are not particularly limited to, a separator for a secondary battery, and particularly a separator for a lithium ion secondary battery and a separator for a lead storage battery.

The polyethylene powder of the present embodiment can also be used while utilizing its characteristics, specifically, excellent wear resistance, excellent high sliding properties, excellent high strength, and excellent high impact properties, which are the properties of high molecular weight polyethylene powders, and examples of the use include, but are not particularly limited to, gears, rolls, curtain rails, rails for pachinko balls, liner sheets for storage silos for grain and the like, coatings for imparting the sliding property for rubber products and the like, ski materials and ski soles, and lining materials for heavy machinery such as trucks and shovel loaders, through molding into a solid by, for example, extrusion, press molding, or cutting.

The polyethylene powder of the present embodiment can also be used, but is not particularly limited to, for example, for obtaining molded bodies by sintering the polyethylene powder, and for filters, dust trap materials, and so on.

EXAMPLES

The present embodiment will be described in more detail below by way of specific Examples and Comparative Examples, but the present embodiment is not limited in any way by the following Examples and Comparative Examples.

Methods for measuring various characteristics and physical properties are shown below.

[Methods for Measuring Various Physical Properties and Characteristics]

(1) Viscosity-Average Molecular Weight (Mv)

The viscosity-average molecular weight (Mv) of a polyethylene powder was calculated in the following manner.

First, 20 mg of a polyethylene powder was added to 20 mL of decalin (decahydronaphthalene), and the mixture was stirred at 150° C. for 2 hr to dissolve the polyethylene powder to obtain a solution.

For the solution, the falling time ($t_s$) between the marked lines was measured in a constant temperature bath at 135° C. using an Ubbelohde type viscometer.

In the same manner, three types of solutions were made by changing the mass of the polyethylene powder, and the falling time between the marked lines was measured in the same manner as above.

The falling time ($t_b$) of only decalin to which the polyethylene powder was not added, as a blank, was measured.

The reduced viscosities ($\eta_{sp}/C$) of polyethylene obtained according to the following mathematical formula A were plotted to derive a linear expression of concentration (C) (unit: g/dL) and the reduced viscosity ($\eta_{sp}/C$) of polyethylene, and the limiting viscosity ($[\eta]$) was obtained by extrapolation to zero concentration.

$$\eta_{sp}/C = (t_s/t_b - 1)/C \text{ (unit: dL/g)} \quad \text{(mathematical formula A)}$$

Next, the viscosity-average molecular weight (Mv) of the polyethylene powder was calculated using the following mathematical formula B and using the value of the limiting viscosity ($[\eta]$) obtained by the above.

$$Mv = (5.34 \times 10^4) \times [\eta]^{1.49} \quad \text{(mathematical formula B)}$$

(2) Density

The density of a polyethylene powder was determined in the following manner.

A material obtained by cutting a section from a pressed sheet of the polyethylene powder, annealing it at 120° C. for 1 hr, and then cooling it at 25° C. for 1 hr was used as a sample for density measurement. On this sample, the density of the polyethylene powder was determined by measurement according to JIS K 7112.

The pressed sheet of the polyethylene powder was made according to ASTM D 1928 Procedure C using a mold 60 mm long, 60 mm wide, and 2 mm thick.

$$d(\log|\eta^*|)/dT, |\eta^*|(T_{max}), |\eta^*|(T_{min}), T_{max}, T_{min} \quad (3)$$

The measurement of complex viscosity with respect to temperature change was performed under Conditions for Measurement of Slurry Viscoelasticity on a slurry consisting of 30 parts by mass of a polyethylene powder and 70 parts by mass of a liquid paraffin described below.

For $|\eta^*|$ with respect to each measurement temperature T, the logarithm to the base 10, $\log|\eta^*|$, was obtained, and a curve of "$d(\log|\eta^*|)/dT$," which represents the amount of complex viscosity change with respect to temperature change, was obtained. The maximum temperature and the minimum temperature within the range in which $d(\log|\eta^*|)/dT$ satisfies the formula (2) were designated as $T_{max}$ and $T_{min}$, respectively, and the complex viscosity at $T_{max}$ and the complex viscosity at $T_{min}$ were designated as $|\eta^*|(T_{max})$ and $|\eta^*|(T_{min})$, respectively. $\{|\eta^*|(T_{max}) - |\eta^*|(T_{min})\}/(T_{max} - T_{min})$ was determined.

(Conditions for Measurement of Slurry Viscoelasticity)
  measuring apparatus: mars iii manufactured by thermo Fisher Scientific K.K.
  stage: 20 mm ϕ
  plate: 20 mm ϕ parallel plate
  gap: 0.5 mm
  slurry composition: 30 parts by mass of a polyethylene powder, 70 parts by mass of a liquid paraffin
  polyethylene powder: A polyethylene powder passing through a sieve having an opening of 425 μm in accordance with the JIS Z 8801 standard was used for measurement.
  measurement conditions: The complex viscosity was measured by the following steps 1 to 3:
  step 1 The slurry was kept at 100° C. for 2 min.
  step 2 After the step 1, the temperature was increased from 100° C. to 140° C. at 1° C./min (at a frequency of 1 Hz and a strain of 0.1% under a nitrogen atmosphere).
  step 3 After the step 2, the temperature was decreased from 140° C. to 100° C. at 1° C./min (at a frequency of 1 Hz and a strain of 0.1% under a nitrogen atmosphere), and the complex viscosity with respect to temperature change was measured every 0.5° C.

(4) Average Particle Diameter D50

The average particle diameter D50 of a polyethylene powder was determined as follows.

100 g of a polyethylene powder was weighed into a 200 mL container, and 1 g of carbon black was added. The polyethylene powder was sufficiently stirred by a medicine spoon.

The stirred polyethylene powder was classified through sieves having openings of 300 μm, 212 μm, 150 μm, 106 μm, 75 μm, and 53 μm in accordance with the JIS Z 8801 standard. The mass of the polyethylene powder remaining on each sieve obtained at that time was integrated in ascending order of the openings. The particle diameter at which the mass reached 50% in the resulting integral curve was regarded as the average particle diameter D50 of the polyethylene powder.

(5) Content of α-Olefin

The measurement of the content (mol %) of a polymerization unit derived from an α-olefin in a polyethylene powder was performed under the measurement conditions shown below according to the method disclosed in G. J. Ray et al., Macromolecules, 10, 773 (1977). The content of the α-olefin was calculated from the area intensity of the signal of methylene carbon found in $^{13}$C-NMR spectra of the measurement.

(Measurement Conditions)
  measuring apparatus: ECS-400 manufactured by JEOL Ltd.
  observed nucleus: $^{13}$C
  observation frequency: 100.53 MHz
  pulse width: 45° (7.5 μsec)
  pulse program: single pulse dec
  PD: 5 sec (6) Contents of Ti, Al, and Mg A polyethylene powder was decomposed under pressure using an apparatus for decomposition with microwave (model ETHOS TC, manufactured by Milestone General K.K.). The element concentrations of Ti, Al, and Mg were measured as metals in the polyethylene powder by the internal standard method using ICP-MS (inductively coupled plasma mass spectrometer, model X series X7, manufactured by Thermo Fisher Scientific K.K.).

(7) Degree of Release from Cooling Roll

A polyethylene powder and a liquid paraffin (P-350™ manufactured by Matsumura Oil Co., Ltd.) were mixed to prepare a slurry liquid.

The ratio between the polyethylene powder and the liquid paraffin in the slurry liquid in each of Examples and Comparative Examples was adjusted so that the torque was 4.0 N/m or more and 4.5 N/m or less.

This slurry liquid was introduced to a twin-screw extruder set to a temperature of 200° C. and a screw rotation rate of 100 rpm to form a uniform gel.

A T-die (width: 150 mm, lip width: 1.0 mm) maintained at 200° C. was attached to the extruder, and the formed uniform gel was extruded into a sheet at a rate of 5 kg/h.

The gel sheet obtained by extrusion was brought into contact with a metal roll (cooling roll) controlled to a surface temperature of 50° C. The degree of release was evaluated in the following manner in terms of the time for which the gel fell off when released from the cooling roll.

(Evaluation Criteria)

A gel that no longer fell off within a time of 10 seconds or less from contact was rated as ⊚.

A gel that no longer fell off within a time of 15 seconds or less and more than 10 seconds from contact was rated as ○.

A gel that no longer fell off within a time of 20 seconds or less and more than 15 seconds from contact was rated as Δ.

When the time that elapsed before the gel no longer fell off exceeded 20 seconds, the gel was rated as X.

(8) Evaluation of Strength of molded body (Puncture Strength) in Low-Ratio Stretching A polyethylene powder and a liquid paraffin (P-350™ manufactured by Matsumura Oil Co., Ltd.) were mixed to prepare a slurry liquid.

40 g of the prepared slurry liquid was introduced to Labo Plastomill (manufactured by Toyo Seiki Co., Ltd., model 40C150, mixer model R-60) and kneaded at 200° C. at a rotation speed of 50 rpm for 10 min to obtain a gel.

The obtained gel was molded into a sheet by the application of a pressure of 10 MPa in a press at 180° C. for 10 min so that the thickness was 0.8 mm to obtain a gel sheet.

The obtained gel sheet was cut into a 10 cm×10 cm square, which was then stretched in a ratio of 4×4 at 115° C. Then, the resultant was impregnated with hexane for 20 min to extract the liquid paraffin, followed by drying to obtain a microporous membrane.

The puncture strength of the obtained microporous membrane was measured using MX2-500N manufactured by IMADA CO., LTD. under the conditions of a radius of curvature of the needle tip of 0.5 mm and a puncture rate of 2 mm/see, and evaluated according to the following criteria.

(Evaluation Criteria)

A microporous membrane having a puncture strength of 55 gf/m$^2$ or more was rated as ⊚.

A microporous membrane having a puncture strength of 40 gf/m$^2$ or more and less than 55 gf/m$^2$ was rated as ○.

A microporous membrane having a puncture strength of 35 gf/m$^2$ or more and less than 45 gf/m$^2$ was rated as Δ.

A microporous membrane having a puncture strength of less than 35 gf/m$^2$ was rated as X.

(9) Evaluation of Heat Shrinkage Rate

The microporous membrane prepared by the method of the section (8) was fixed to a metal frame and left standing for 1 min in a constant temperature bath at 134° C. for heat treatment. The microporous membrane was taken out of the constant temperature bath, then removed from the metal frame, and cut into 50 mm square. Subsequently, the cut piece of the microporous membrane was left standing for 1 hr in a constant temperature bath at 115° C. and then cooled at 25° C. for 20 min. Four sides of the treated microporous membrane were measured, and the shrinkage rate from 50 mm was determined and evaluated according to the following criteria.

(Evaluation Criteria)

A microporous membrane having a shrinkage rate of less than 5% was rated as ⊚.

A microporous membrane having a shrinkage rate of less than 10% and 5% or more was rated as ○.

A microporous membrane having a shrinkage rate of less than 15% and 10% or more was rated as Δ.

A microporous membrane having a shrinkage rate of 15% or more was rated as X.

[Production Examples]Synthesis of Catalyst (Synthesis of Supported Metallocene Catalyst Component [A-1])

(1) Preparation of Starting Material (a-1)

Spherical silica having an average particle size of 7 μm, a surface area of 700 m$^2$/g, and an intraparticle pore volume of 1.9 mL/g was calcined and dehydrated at 500° C. for 5 hr in a nitrogen atmosphere.

40 g of this dehydrated silica was dispersed in 800 mL of hexane in an autoclave with a capacity of 1.8 L in a nitrogen atmosphere to obtain slurry.

While the obtained slurry was kept at 20° C. with stirring, 100 mL of a triethylaluminum (concentration: 1 mol/L) solution in hexane was dropped thereto over 1 hr, followed by stirring at the same temperature as above for 2 hr.

Then, unreacted triethylaluminum in a supernatant was removed by the decantation of the obtained reaction mixture.

In this way, 800 mL of hexane slurry of a silica component (starting material (a-1)) treated with triethylaluminum was obtained.

(2) Preparation of Starting Material (a-2)

200 mmol of [(N-t-butylamido) (tetramethyl-η5-cyclopentadienyl)dimethylsilane]titanium-1,3-pentadiene (hereinafter referred to as "titanium complex") was dissolved in 1250 mL of Isopar E [trade name of a hydrocarbon mixture manufactured by Exxon Chemical (U.S.A.)], and the titanium complex concentration was adjusted to 0.1 mol/L by adding 25 mL of a 1 mol/L Mg$_6$ (C$_2$H$_5$)$_6$ (n-C$_4$H$_9$)$_6$Al (C$_2$H$_5$)$_3$ solution in hexane synthesized in advance from triethylaluminum and butylethylmagnesium and further adding hexane, to thereby obtain a starting material (a-2).

(3) Preparation of Starting Material (a-3)

5.7 g of bis(hydrogenated tallow alkyl)methylammonium-tris(pentafluorophenyl) (4-hydroxyphenyl)borate (hereinafter referred to as "borate") was added to 50 mL of toluene and dissolved to obtain a 100 mmol/L borate solution in toluene. To this borate solution in toluene, 5 mL of a 1 mol/L ethoxy diethylaluminum solution in hexane was added at room temperature, and further, hexane was added such that the borate concentration in the solution was 70 mmol/L. Then, the mixture was stirred at room temperature for 1 hr to obtain a reaction mixture (starting material (a-3)) containing borate.

(4) Synthesis of Supported Metallocene Catalyst [A-1]

96 mL of the titanium complex obtained in the section (2) (starting material (a-2)) and 138 mL of the reaction mixture containing borate obtained in the section (3) (starting material (a-3)) were simultaneously added to 800 mL of the hexane slurry of the silica component obtained in the section (1) (starting material (a-1)) over 1 hr with stirring at 20° C. The mixture was further stirred at the same temperature as above for 1 hr so that the titanium complex was reacted with the borate. After the completion of the reaction, the supernatant liquid was removed, and unreacted starting materials for catalyst were removed with hexane to obtain a supported metallocene catalyst [A-1](hereinafter also referred to as a solid catalyst component [A-1]) in which an active catalyst species was formed on silica. The solid catalyst component [A-1] had a large amount of titanium supported and had high active site density.

(Synthesis of Solid Catalyst Component [B-1])

(1) Preparation of Starting Material (b-1)

In an 8 L stainless steel autoclave sufficiently purged with nitrogen, 2,000 mL of a 1 mol/L Mg$_6$(C$_4$H$_9$)$_{12}$Al(C$_2$H$_5$)$_3$ solution in hexane (corresponding to 2000 mmol of magnesium and aluminum) was placed, and 146 mL of a 5.47 mol/L n-butanol solution in hexane was dropped over 3 hr with stirring at 50° C. After completion, the line was washed with 300 mL of hexane.

Further, the stirring was continued at 50° C. over 2 hr. The material cooled to normal temperature after the completion of the reaction was designated as a starting material (b-1). The starting material (b-1) had a magnesium concentration of 0.704 mol/L.

(2) Preparation of Starting Material (b-2)

In an 8 L stainless steel autoclave sufficiently purged with nitrogen, 2,000 mL of a 1 mol/L Mg$_6$(C$_4$H$_9$)$_{12}$Al(C$_2$H$_5$)$_3$ solution in hexane (corresponding to 2000 mmol of magnesium and aluminum) was placed, and 240 mL of an 8.33 mol/L methylhydrogenpolysiloxane (manufactured by Shin-Etsu Chemical Co., Ltd.) solution in hexane was dropped over 3 hr with stirring at 80° C. After completion, the line was washed with 300 mL of hexane. Further, the stirring was continued at 80° C. over 2 hr. The material cooled to normal temperature after the completion of the reaction was designated as a starting material (b-2). The starting material (b-2) had a total concentration of magnesium and aluminum of 0.786 mol/L.

(3) Preparation of (B-1) Support

In an 8 L stainless steel autoclave sufficiently purged with nitrogen, 1,000 mL of a 1 mol/L hydroxytrichlorosilane solution in hexane was placed, and 1340 mL of a solution of the organomagnesium compound of the starting material (b-1) (corresponding to 943 mmol of magnesium) in hexane was dropped over 3 hr at 65° C. Further, the reaction was continued at 65° C. for 1 hr with stirring. After the completion of the reaction, the supernatant liquid was removed, followed by washing the residue four times with 1,800 mL of hexane to obtain a support (B-1). This support (B-1) was analyzed, and as a result, the amount of magnesium included was 7.5 mmol per gram of the solid.

(4) Synthesis of Solid Catalyst Component [B-1]

618 mL of a 2 mol/L titanium tetrachloride solution in hexane and 1572 mL of the starting material (b-2) were simultaneously added to 1,970 mL of a slurry containing 110 g of the support (B-1) in hexane over 3 hr with stirring at 10° C. After the addition, the reaction was continued at 10° C. for 1 hr. After the completion of the reaction, 1,100 mL of the supernatant liquid was removed, followed by washing the residue four times with 1,100 mL of hexane to obtain a solid catalyst component [B-1]. The solid catalyst component [B-1] had a large amount of titanium supported and had high active site density.

(Synthesis of Supported Metallocene Catalyst Component [A-2])
(1) Preparation of Starting Material (a-4)

Spherical silica having an average particle size of 7 μm, a surface area of 700 m$^2$/g, and an intraparticle pore volume of 1.9 mL/g was calcined and dehydrated at 500° C. for 5 hr in a nitrogen atmosphere.

40 g of this dehydrated silica was dispersed in 800 mL of hexane in an autoclave with a capacity of 1.8 L in a nitrogen atmosphere to obtain slurry.

While the obtained slurry was kept at 20° C. with stirring, 100 mL of a triethylaluminum (concentration: 1 mol/L) solution in hexane was dropped thereto over 1 hr, followed by stirring at the same temperature as above for 2 hr.

Then, unreacted triethylaluminum in a supernatant was removed by the decantation of the obtained reaction mixture.

In this way, 800 mL of hexane slurry of a silica component (starting material (a-4)) treated with triethylaluminum was obtained.

(2) Preparation of Starting Material (a-5)

200 mmol of [(N-t-butylamido) (tetramethyl-η5-cyclopentadienyl)dimethylsilane]titanium-1,3-pentadiene (hereinafter referred to as "titanium complex") was dissolved in 1250 mL of Isopar E [trade name of a hydrocarbon mixture manufactured by Exxon Chemical (U.S.A.)], and the titanium complex concentration was adjusted to 0.1 mol/L by adding 25 mL of a 1 mol/L Mg$_6$ (C$_2$H$_5$)$_6$ (n-C$_4$H$_9$)$_6$Al (C$_2$H$_5$)$_3$ solution in hexane synthesized in advance from triethylaluminum and butylethylmagnesium and further adding hexane, to thereby obtain a starting material (a-5).

(3) Preparation of Starting Material (a-6)

5.7 g of bis(hydrogenated tallow alkyl)methylammonium-tris(pentafluorophenyl) (4-hydroxyphenyl)borate (hereinafter referred to as "borate") was added to 50 mL of toluene and dissolved to obtain a 100 mmol/L borate solution in toluene. To this borate solution in toluene, 5 mL of a 1 mol/L ethoxy diethylaluminum solution in hexane was added at room temperature, and further, hexane was added such that the borate concentration in the solution was 70 mmol/L. Then, the mixture was stirred at room temperature for 1 hr to obtain a reaction mixture (starting material (a-6)) containing borate.

(4) Synthesis of Supported Metallocene Catalyst [A-2]

32 mL of the titanium complex obtained in the section (2) (starting material (a-5)) and 46 mL of the reaction mixture containing borate obtained in the section (3) (starting material (a-6)) were simultaneously added to 800 mL of the hexane slurry of the silica component obtained in the section (1) (starting material (a-4)) over 1 hr with stirring at 20° C. The mixture was further stirred at the same temperature as above for 1 hr so that the titanium complex was reacted with the borate. After the completion of the reaction, the supernatant liquid was removed, and unreacted starting materials for catalyst were removed with hexane to obtain a supported metallocene catalyst [A-2](hereinafter also referred to as a solid catalyst component [A-2]) in which an active catalyst species was formed on silica. The solid catalyst component [A-2] had a small amount of titanium supported and had low active site density.

(Synthesis of Solid Catalyst Component [B-2])
(1) Preparation of Starting Material (b-3)

In an 8 L stainless steel autoclave sufficiently purged with nitrogen, 2,000 mL of a 1 mol/L Mg$_6$(C$_4$H$_9$)$_{12}$Al(C$_2$H$_5$)$_3$ solution in hexane (corresponding to 2000 mmol of magnesium and aluminum) was placed, and 146 mL of a 5.47 mol/L n-butanol solution in hexane was dropped over 3 hr with stirring at 50° C. After completion, the line was washed with 300 mL of hexane.

Further, the stirring was continued at 50° C. over 2 hr. The material cooled to normal temperature after the completion of the reaction was designated as a starting material (b-3). The starting material (b-3) had a magnesium concentration of 0.704 mol/L.

(2) Preparation of Starting Material (b-4)

In an 8 L stainless steel autoclave sufficiently purged with nitrogen, 2,000 mL of a 1 mol/L Mg$_6$ (C$_4$H$_9$)$_{12}$Al (C$_2$H$_5$)$_3$ solution in hexane (corresponding to 2000 mmol of magnesium and aluminum) was placed, and 240 mL of an 8.33 mol/L methylhydrogenpolysiloxane (manufactured by Shin-Etsu Chemical Co., Ltd.) solution in hexane was dropped over 3 hr with stirring at 80° C. After completion, the line was washed with 300 mL of hexane. Further, the stirring was continued at 80° C. over 2 hr. The material cooled to normal temperature after the completion of the reaction was designated as a starting material (b-4). The starting material (b-4) had a total concentration of magnesium and aluminum of 0.786 mol/L.

(3) Preparation of (B-2) Support

In an 8 L stainless steel autoclave sufficiently purged with nitrogen, 1,000 mL of a 1 mol/L hydroxytrichlorosilane solution in hexane was placed, and 1340 mL of a solution of the organomagnesium compound of the starting material (b-3) (corresponding to 943 mmol of magnesium) in hexane was dropped over 3 hr at 65° C. Further, the reaction was continued at 65° C. for 1 hr with stirring. After the completion of the reaction, the supernatant liquid was removed, followed by washing the residue four times with 1,800 mL of hexane to obtain a support (B-2). This support (B-2) was analyzed, and as a result, the amount of magnesium included was 7.5 mmol per gram of the solid.

(4) Synthesis of Solid Catalyst Component [B-2]

103 mL of a 1 mol/L titanium tetrachloride solution in hexane and 131 mL of the starting material (b-4) were simultaneously added to 1,970 mL of a slurry containing 110 g of the support (B-2) in hexane over 3 hr with stirring at 10° C. After the addition, the reaction was continued at 10° C. for 1 hr. After the completion of the reaction, 1,100 mL of the supernatant liquid was removed, followed by washing the residue four times with 1,100 mL of hexane to obtain a solid catalyst component [B-2]. The solid catalyst component [B-2] had a small amount of titanium supported and had low active site density.

Example 1

(Polymerization of Polyethylene Powder)

Hexane, ethylene, hydrogen, and the solid catalyst component [B-1] were continuously supplied to a vessel type 300 L polymerization reactor equipped with a stirring blade. The reaction was continuously performed under the condition of an average residence time of 2.1 hr at a polymerization pressure of 0.40 MPa and a polymerization temperature kept at 80° C. by jacket cooling. Hexane in which ethylene gas was dissolved was adjusted to 40° C. and supplied at 80 L/hr to the polymerization reactor.

The solid catalyst component [B-1] was adjusted to 55° C. and added at a rate of 0.3 g/hr into the slurry in the polymerization reactor with hexane as a transfer liquid. Triisobutylaluminum was adjusted to 55° C. and added at a rate of 6.0 mmol/hr into the slurry in the polymerization reactor from a supply line adjacent to that for the solid catalyst component [B-1].

Ethylene was introduced into the slurry in the polymerization reactor from a supply line adjacent to the supply line for the solid catalyst component [B-1]. Hydrogen was introduced to a gas phase. In this respect, hydrogen gas was continuously supplied by a pump so that the hydrogen concentration was 20 mol % based on the gas phase ethylene in the polymerization reactor.

A portion of the polymerization slurry was extracted at a rate of 1500 L/hr from the polymerization reactor through the central portion of the polymerization reactor into a pipe placed outside the polymerization reactor, cooled to 70° C., and then brought back to the upper portion of the polymerization reactor. The polymerization slurry was continuously fed to a centrifuge from the bottom of the polymerization reactor so that the level of the polymerization reactor was kept constant. The polyethylene powder was separated from the solvent and the others than the polyethylene powder.

The separated polyethylene powder was dried with nitrogen blowing at 90° C. In this drying step, steam was sprayed onto the powder after the polymerization to carry out the deactivation of the catalyst and the promoters. The obtained polyethylene powder was passed through a sieve having an opening of 425 μm, and the polyethylene powder not passing through the sieve was removed to obtain a polyethylene powder of Example 1 having a viscosity-average molecular weight of $25 \times 10^4$ g/mol and a density of 950 kg/m$^3$. The physical properties of the obtained polyethylene powder are shown in Table 1-1.

Example 2

Hexane, ethylene, hydrogen, and the supported metallocene catalyst component [A-1] were continuously supplied to a vessel type 300 L polymerization reactor equipped with an anchor-shaped stirring blade. The polymerization pressure was 0.5 MPa, and the polymerization temperature was kept at 80° C. by jacket cooling. Hexane in which ethylene gas was dissolved was adjusted to 50° C. and supplied at 40 L/hr to the polymerization reactor. The supported metallocene catalyst component [A-1] was adjusted to 40° C. and added at a rate of 0.2 g/hr into the slurry in the polymerization reactor with hexane as a transfer liquid. Triisobutylaluminum was adjusted to 40° C. and added at a rate of 5.0 mmol/hr into the slurry in the polymerization reactor from the same supply line as that for the supported metallocene catalyst component [A-1]. The Tebbe reagent was adjusted to 40° C. and added at a rate of 0.3 μmol/hr from the same supply line as that for the supported metallocene catalyst component [A-1].

Ethylene gas and hydrogen gas were introduced to a gas phase. In this respect, hydrogen gas was continuously supplied by a pump so that the hydrogen concentration was 1200 ppm based on the ethylene.

The polymerization slurry was continuously extracted into a flash drum with a pressure of 0.05 MPa and a temperature of 60° C. so that the level of the polymerization reactor was kept constant. Unreacted ethylene and hydrogen were separated.

Next, a small amount of methanol was added to the obtained polymerization slurry to deactivate the catalyst. Then, the solvent was filtered off. The content of the solvent and the like in the polymer after the filtration was 195%.

The separated and filtered polyethylene powder was dried with nitrogen blowing at 95° C. Then, the polyethylene powder of Example 2 having a viscosity-average molecular weight of $27 \times 10^4$ g/mol and a density of 945 kg/m$^3$ was obtained by the same operation as Example 1. The physical properties of the obtained polyethylene powder are shown in Table 1-1.

Example 3

The polyethylene powder of Example 3 having a viscosity-average molecular weight of $35 \times 10^4$ g/mol and a density of 950 kg/m$^3$ was obtained by the same operation as Example 2 except the following: in the polymerization step, the polymerization pressure was 0.7 MPa, the polymerization temperature was 70° C., hexane in which ethylene gas was dissolved was adjusted to 40° C. and supplied at 80 L/hr to the polymerization reactor, ethylene was introduced into the slurry in the polymerization reactor from a pipe adjacent to that for the supported metallocene catalyst component [A-1], and the hydrogen concentration in the mixed gas of ethylene and hydrogen was 1050 ppm. The physical properties of the obtained polyethylene powder are shown in Table 1-1.

Example 4

The polyethylene powder of Example 4 having a viscosity-average molecular weight of $35 \times 10^4$ g/mol and a density of 945 kg/m$^3$ was obtained by the same operation as Example 1 except the following: in the polymerization step, the polymerization pressure was 0.5 MPa, the polymerization temperature was 78° C., the solid catalyst component [B-1] and triisobutylaluminum were adjusted to 55° C. and added into the slurry in the polymerization reactor from the same supply line, and 0.10 mol % of 1-butene based on the ethylene was introduced to the gas phase. The physical properties of the obtained polyethylene powder are shown in Table 1-1.

Example 5

The polyethylene powder of Example 5 having a viscosity-average molecular weight of $40 \times 10^4$ g/mol and a density of 940 kg/m$^3$ was obtained by the same operation as Example 1 except the following: in the polymerization step, the solid catalyst component [B-2] was used instead of the solid catalyst component [B-1], the polymerization pressure was 0.5 MPa, hexane in which ethylene gas was dissolved was adjusted to 45° C. and supplied to the polymerization reactor, and the solid catalyst component [B-2] and triisobutylaluminum were adjusted to 40° C. and added into the slurry in the polymerization reactor from the same supply line. The physical properties of the obtained polyethylene powder are shown in Table 1-1.

Example 6

The polyethylene powder of Example 6 having a viscosity-average molecular weight of $45 \times 10^4$ g/mol and a density of 945 kg/m$^3$ was obtained by the same operation as Example 1 except the following: in the polymerization step, hexane in which ethylene gas was dissolved was adjusted to 45° C. and supplied at 40 L/hr to the polymerization reactor, the solid catalyst component [B-1] and triisobutylaluminum were adjusted to 50° C. and added into the slurry in the polymerization reactor from the same supply line, the supply lines for ethylene and for the solid catalyst component [B-1] were not adjacent, the hydrogen concentration in the mixed gas of ethylene and hydrogen in the gas phase in the polymerization reactor was 17 mol %, and 1-butene was introduced at a ratio of 0.20 mol % based on the ethylene to the gas phase in the polymerization reactor. The physical properties of the obtained polyethylene powder are shown in Table 1-1.

Example 7

The polyethylene powder of Example 7 having a viscosity-average molecular weight of 45×10$^4$ g/mol and a density of 940 kg/m$^3$ was obtained by the same operation as Example 1 except the following: in the polymerization step, hexane in which ethylene gas was dissolved was adjusted to 55° C. and supplied at 40 L/hr to the polymerization reactor, the solid catalyst component [B-1] and triisobutylaluminum were adjusted to 40° C. and added into the slurry in the polymerization reactor from the same supply line, the hydrogen concentration in the mixed gas of ethylene and hydrogen in the gas phase in the polymerization reactor was 17 mol %, and 1-butene was introduced at a ratio of 0.20 mol % based on the ethylene to the gas phase in the polymerization reactor. The physical properties of the obtained polyethylene powder are shown in Table 1-1.

Example 8

The polyethylene powder of Example 8 having a viscosity-average molecular weight of 45×10$^4$ g/mol and a density of 940 kg/m$^3$ was obtained by the same operation as Example 1 except the following: in the polymerization step, the polymerization pressure was 0.5 MPa, the polymerization temperature was 78° C., hexane in which ethylene gas was dissolved was adjusted to 35° C. and supplied to the polymerization reactor, the solid catalyst component [B-1] and triisobutylaluminum were adjusted to 40° C. and added into the slurry in the polymerization reactor from the same supply line, and the hydrogen concentration in the mixed gas of ethylene and hydrogen in the gas phase in the polymerization reactor was 18 mol %. The physical properties of the obtained polyethylene powder are shown in Table 1-1.

Example 9

The polyethylene powder of Example 9 having a viscosity-average molecular weight of 50×10$^4$ g/mol and a density of 945 kg/m$^3$ was obtained by the same operation as Example 1 except the following: in the polymerization step, the solid catalyst component [B-2] was used instead of the solid catalyst component [B-1], the polymerization pressure was 0.5 MPa, hexane in which ethylene gas was dissolved was adjusted to 45° C. and supplied to the polymerization reactor, the solid catalyst component [B-2] and triisobutylaluminum were adjusted to 40° C. and added into the slurry in the polymerization reactor from the same supply line, and the hydrogen concentration in the mixed gas of ethylene and hydrogen in the gas phase in the polymerization reactor was 15 mol %. The physical properties of the obtained polyethylene powder are shown in Table 1-1.

Example 10

The polyethylene powder of Example 10 having a viscosity-average molecular weight of 50×10$^4$ g/mol and a density of 945 kg/m$^3$ was obtained by the same operation as Example 1 except the following: in the polymerization step, the solid catalyst component [B-1] and triisobutylaluminum were adjusted to 40° C. and added into the slurry in the polymerization reactor from the same supply line, and the hydrogen concentration in the mixed gas of ethylene and hydrogen in the gas phase in the polymerization reactor was 15 mol %. The physical properties of the obtained polyethylene powder are shown in Table 1-2.

Example 11

The polyethylene powder of Example 11 having a viscosity-average molecular weight of 90×10$^4$ g/mol and a density of 940 kg/m$^3$ was obtained by the same operation as Example 2 except the following: in the polymerization step, the polymerization pressure was 0.70 MPa, the polymerization temperature was 70° C., hexane in which ethylene gas was dissolved was adjusted to 45° C. and supplied to the polymerization reactor, the supported metallocene catalyst component [A-1], triisobutylaluminum, and the Tebbe reagent were adjusted to 45° C. and added into the slurry in the polymerization reactor from the same supply line, ethylene was introduced into the slurry in the polymerization reactor from a pipe adjacent to that for the supported metallocene catalyst component [A-1], and the hydrogen concentration in the mixed gas of ethylene gas and hydrogen gas was 300 ppm. The physical properties of the obtained polyethylene powder are shown in Table 1-2.

Example 12

The polyethylene powder of Example 12 having a viscosity-average molecular weight of 90×10$^4$ g/mol and a density of 940 kg/m$^3$ was obtained by the same operation as Example 1 except the following: in the polymerization step, hexane in which ethylene gas was dissolved was adjusted to 45° C. and supplied to the polymerization reactor, the solid catalyst component [B-1] and triisobutylaluminum were adjusted to 45° C. and added into the slurry in the polymerization reactor from the same supply line, and the hydrogen concentration in the mixed gas of ethylene and hydrogen in the gas phase in the polymerization reactor was 8 mol %. The physical properties of the obtained polyethylene powder are shown in Table 1-2.

Example 131

The polyethylene powder of Example 13 having a viscosity-average molecular weight of 150×10$^4$ g/mol and a density of 935 kg/m$^3$ was obtained by the same operation as Example 1 except the following: in the polymerization step, hexane in which ethylene gas was dissolved was adjusted to 45° C. and supplied, the solid catalyst component [B-1] and triisobutylaluminum were adjusted to 35° C. and added into the slurry in the polymerization reactor from the same supply line, and the hydrogen concentration in the mixed gas of ethylene and hydrogen in the gas phase in the polymerization reactor was 3 mol %. The physical properties of the obtained polyethylene powder are shown in Table 1-2.

Example 14

The polyethylene powder of Example 14 having a viscosity-average molecular weight of 180×10$^4$ g/mol and a density of 930 kg/m$^3$ was obtained by the same operation as Example 2 except the following: in the polymerization step, the polymerization pressure was 0.50 MPa, the polymerization temperature was 78° C., hexane in which ethylene gas was dissolved was adjusted to 45° C. and supplied at 80 L/hr to the polymerization reactor, the Tebbe reagent was not used, ethylene was introduced into the slurry in the polymerization reactor from a supply line adjacent to that for the supported metallocene catalyst component [A-1], and the hydrogen concentration in the mixed gas of ethylene and hydrogen was 150 ppm. The physical properties of the obtained polyethylene powder are shown in Table 1-2.

Example 15

The polyethylene powder of Example 15 having a viscosity-average molecular weight of $320\times10^4$ g/mol and a density of 925 kg/m$^3$ was obtained by the same operation as Example 1 except the following: in the polymerization step, the polymerization pressure was 0.5 MPa, the polymerization temperature was 78° C., hexane in which ethylene gas was dissolved was adjusted to 50° C. and supplied to the polymerization reactor, the solid catalyst component [B-1] and triisobutylaluminum were adjusted to 50° C. and added into the slurry in the polymerization reactor from the same supply line, hydrogen was introduced into the slurry in the polymerization reactor, and the hydrogen concentration in the mixed gas of ethylene and hydrogen in the gas phase in the polymerization reactor was 1 mol %. The physical properties of the obtained polyethylene powder are shown in Table 1-2.

Example 16

The polyethylene powder of Example 16 having a viscosity-average molecular weight of $580\times10^4$ g/mol and a density of 930 kg/m$^3$ was obtained by the same operation as Example 1 except the following: in the polymerization step, the polymerization pressure was 0.5 MPa, the polymerization temperature was 78° C., hexane in which ethylene gas was dissolved was adjusted to 45° C. and supplied to the polymerization reactor, the solid catalyst component [B-1] and triisobutylaluminum were adjusted to 50° C. and added into the slurry in the polymerization reactor from different supply lines adjacent to each other, and no hydrogen was introduced. The physical properties of the obtained polyethylene powder are shown in Table 1-2.

Example 17

The polyethylene powder of Example 17 having a viscosity-average molecular weight of $900\times10^4$ g/mol and a density of 920 kg/m$^3$ was obtained by the same operation as Example 2 except the following: in the polymerization step, the polymerization pressure was 0.80 MPa, the polymerization temperature was 75° C., hexane in which ethylene gas was dissolved was adjusted to 50° C. and supplied at 80 L/hr to the polymerization reactor, the supported metallocene catalyst component [A-1] was introduced to the gas phase at 50° C., triisobutylaluminum was adjusted to 50° C. and supplied to the gas phase in the polymerization reactor from the same supply line as that for the supported metallocene catalyst component [A-1], the Tebbe reagent was not used, hydrogen was introduced into the slurry in the polymerization reactor, and the hydrogen concentration in the mixed gas of ethylene and hydrogen was 85 ppm. The physical properties of the obtained polyethylene powder are shown in Table 1-2.

Example 18

The polyethylene powder of Example 18 was obtained by adding EXP20 (cyclohexane-1,2-dicarboxylate) manufactured by Milliken Japan K.K. as a nucleating agent at a concentration of 400 ppm to the polyethylene powder of Example 9, and stirring and mixing them in a mixer. The physical properties of the obtained polyethylene powder are shown in Table 1-2.

Comparative Example 1

The polyethylene powder of Comparative Example 1 having a viscosity-average molecular weight of $15\times10^4$ g/mol and a density of 940 kg/m$^3$ was obtained by the same operation as Example 1 except the following: in the polymerization step, the polymerization temperature was 75° C., hexane in which ethylene gas was dissolved was supplied at 40 L/hr to the polymerization reactor, the solid catalyst component [B-1] and triisobutylaluminum were added at 45° C. into the slurry in the polymerization reactor from same supply line. The physical properties of the obtained polyethylene powder are shown in Table 2.

Comparative Example 2

The polyethylene powder of Comparative Example 2 having a viscosity-average molecular weight of $35\times10^4$ g/mol and a density of 945 kg/m$^3$ was obtained by the same operation as Example 1 except the following: in the polymerization step, the solid catalyst component [B-2] was used instead of the solid catalyst component [B-1], the polymerization pressure was 0.5 MPa, the polymerization temperature was 82° C., hexane in which ethylene gas was dissolved was adjusted to 45° C. and supplied to the polymerization reactor, the solid catalyst component [B-2] and triisobutylaluminum were added at 40° C. to the gas phase in the polymerization reactor from the same supply line, ethylene was introduced to the gas phase from a supply line that was not adjacent to the supply line for the solid catalyst component [B-2], and hydrogen was introduced into the slurry in the polymerization reactor. The physical properties of the obtained polyethylene powder are shown in Table 2.

Comparative Example 3

The polyethylene powder of Comparative Example 3 having a viscosity-average molecular weight of $40\times10^4$ g/mol and a density of 945 kg/m$^3$ was obtained by the same operation as Example 1 except the following: in the polymerization step, the polymerization temperature was 82° C., hexane in which ethylene gas was dissolved was adjusted to 55° C. and supplied to the polymerization reactor, the solid catalyst component [B-1] and triisobutylaluminum were added at 45° C. to the gas phase in the polymerization reactor from the same supply line, ethylene was introduced to the gas phase in the polymerization reactor from a supply line that was not adjacent to the supply line for the solid catalyst component [B-1], hydrogen was introduced into the gas phase in the polymerization reactor, and the hydrogen concentration in the mixed gas of ethylene and hydrogen in the gas phase in the polymerization reactor was 17 mol %. The physical properties of the obtained polyethylene powder are shown in Table 2.

Comparative Example 4

The polyethylene powder of Comparative Example 4 having a viscosity-average molecular weight of $50\times10^4$ g/mol and a density of 950 kg/m$^3$ was obtained by the same operation as Example 1 except the following: in the polymerization step, hexane in which ethylene gas was dissolved was adjusted to 55° C. and supplied to the polymerization reactor, the solid catalyst component [B-1] and triisobutylaluminum were adjusted to 25° C. and added to the gas phase in the polymerization reactor from different supply lines, ethylene was introduced to the gas phase in the polymerization reactor from a supply line that was not adjacent to the supply line for the solid catalyst component [B-1], hydrogen was introduced into the slurry in the polymerization reactor, and the hydrogen concentration in the mixed gas of ethylene and hydrogen in the gas phase in the polymerization reactor was 15 mol %. The physical properties of the obtained polyethylene powder are shown in Table 2.

Comparative Example 5

The polyethylene powder of Comparative Example 5 having a viscosity-average molecular weight of 65×10$^4$ g/mol and a density of 940 kg/m$^3$ was obtained by the same operation as Example 2 except the following: in the polymerization step, the supported metallocene catalyst component [A-2] was used instead of the supported metallocene catalyst component [A-1], the polymerization pressure was 0.8 MPa, the polymerization temperature was 70° C., hexane in which ethylene gas was dissolved was adjusted to 45° C. and supplied at 80 L/hr to the polymerization reactor, the supported metallocene catalyst component [A-2], triisobutylaluminum, and the Tebbe reagent were adjusted to 55° C. and added to the gas phase in the polymerization reactor from different supply lines, hydrogen was introduced into the slurry in the polymerization reactor, the hydrogen concentration in the mixed gas of ethylene and hydrogen was 400 ppm, and 1-butene was introduced at a ratio of 0.10 mol % based on the ethylene to the gas phase in the polymerization reactor. The physical properties of the obtained polyethylene powder are shown in Table 2.

Comparative Example 6

The polyethylene powder of Comparative Example 6 having a viscosity-average molecular weight of 85×10$^4$ g/mol and a density of 945 kg/m$^3$ was obtained by the same operation as Example 2 except the following: in the polymerization step, the supported metallocene catalyst component [A-2] was used instead of the supported metallocene catalyst component [A-1], the polymerization pressure was 0.8 MPa, the polymerization temperature was 72° C., hexane in which ethylene gas was dissolved was adjusted to 35° C. and supplied at 80 L/hr to the polymerization reactor, the supported metallocene catalyst component [A-2], triisobutylaluminum, and the Tebbe reagent were adjusted to 55° C. and added to the gas phase in the polymerization reactor from different supply lines, hydrogen was introduced into the slurry in the polymerization reactor, and the hydrogen concentration in the mixed gas of ethylene and hydrogen was 250 ppm. The physical properties of the obtained polyethylene powder are shown in Table 2.

Comparative Example 71

The polyethylene powder of Comparative Example 7 having a viscosity-average molecular weight of 350×10$^4$ g/mol and a density of 930 kg/m$^3$ was obtained by the same operation as Example 1 except the following: in the polymerization step, the solid catalyst component [B-2]was used instead of the solid catalyst component [B-1], the polymerization temperature was 75° C., hexane in which ethylene gas was dissolved was adjusted to 55° C. and supplied to the polymerization reactor, the solid catalyst component [B-2] and triisobutylaluminum were adjusted to 50° C. and added to the gas phase in the polymerization reactor from the same supply line, ethylene was introduced to the gas phase in the polymerization reactor from a supply line that was not adjacent to the supply line for the solid catalyst component [B-2], and no hydrogen was introduced. The physical properties of the obtained polyethylene powder are shown in Table 2.

Comparative Example 8

The polyethylene powder of Comparative Example 8 having a viscosity-average molecular weight of 550×10$^4$ g/mol and a density of 930 kg/m$^3$ was obtained by the same operation as Example 1 except the following: in the polymerization step, the solid catalyst component [B-2]was used instead of the solid catalyst component [B-1], the polymerization pressure was 0.5 MPa, hexane in which ethylene gas was dissolved was adjusted to 50° C. and supplied to the polymerization reactor, the solid catalyst component [B-2] was adjusted to 35° C. and added into the polymerization reactor, triisobutylaluminum was adjusted to 35° C. and added into the polymerization reactor from a supply line different from that for the solid catalyst component [B-2], and no hydrogen was introduced. The physical properties of the obtained polyethylene powder are shown in Table 2.

Comparative Example 9

The polyethylene powder of Comparative Example 9 having a viscosity-average molecular weight of 740×10$^4$ g/mol and a density of 930 kg/m$^3$ was obtained by the same operation as Example 1 except the following: in the polymerization step, the solid catalyst component [B-2]was used instead of the solid catalyst component [B-1], the polymerization pressure was 0.5 MPa, the polymerization temperature was 78° C., hexane in which ethylene gas was dissolved was adjusted to 35° C. and supplied at 40 L/hr to the polymerization reactor, the solid catalyst component [B-2] was adjusted to 35° C. and added into the polymerization reactor, triisobutylaluminum was added at 35° C. into the polymerization reactor from a supply line different from that for the solid catalyst component [B-2], and no hydrogen was added. The physical properties of the obtained polyethylene powder are shown in Table 2.

Comparative Example 10

The polyethylene powder of Comparative Example 10 having a viscosity-average molecular weight of 1050×10$^4$ g/mol and a density of 915 kg/m$^3$ was obtained by the same operation as Example 2 except the following: in the polymerization step, the polymerization pressure was 0.8 MPa, the polymerization temperature was 75° C., hexane in which ethylene gas was dissolved was adjusted to 45° C. and supplied to the polymerization reactor, the supported metallocene catalyst component [A-1] and triisobutylaluminum were adjusted to 45° C. and added into the polymerization reactor from the same supply line, the Tebbe reagent was not used, ethylene was introduced into the slurry in the polymerization reactor from a supply line adjacent to that for the supported metallocene catalyst component [A-1], and the hydrogen concentration in the mixed gas of ethylene and hydrogen was 70 ppm.

The physical properties of the obtained polyethylene powder are shown in Table 2.

Comparative Example 11

The polyethylene powder of Comparative Example 11 was obtained by adding EXP20 manufactured by Milliken Japan K.K. as a nucleating agent at a concentration of 400 ppm to the polyethylene powder of Comparative Example 6, and stirring and mixing them in a mixer. The physical properties of the obtained polyethylene powder are shown in Table 2.

TABLE 1-1

| | Unit | Example 1 | Example 2 | Example 3 | Example 4 | Example 5 | Example 6 | Example 7 | Example 8 | Example 9 |
|---|---|---|---|---|---|---|---|---|---|---|
| $\{\eta^*(T_{max}) - \eta^*(T_{min})\}/(T_{max} - T_{min})$ | $10^4$ Pas/°C | −24.2 | −8.2 | −10.1 | −15.0 | −13.0 | −15.6 | −8.9 | −16.5 | −6.0 |
| Viscosity-average molecular weight | 10K | 25 | 27 | 35 | 35 | 40 | 45 | 45 | 45 | 50 |
| Density | kg/m³ | 950 | 945 | 950 | 945 | 940 | 945 | 940 | 940 | 945 |
| Maximum temperature at which $d(\log|\eta^*|)/dT$ is −0.1 or less | °C | 118.3 | 119.4 | 118.6 | 119.1 | 118.9 | 118.1 | 118.1 | 117.6 | 120.1 |
| $\eta^*$ at which value of $d(\log|\eta^*|)/dT$ is minimum value | $10^4$ Pas | 9.8 | 14.2 | 8.1 | 3.6 | 13.8 | 8.0 | 2.9 | 7.5 | 2.8 |
| $0.74\log(Mv) - 8.2$ | — | −4.2 | −4.2 | −4.1 | −4.1 | −4.1 | −4.0 | −4.0 | −4.0 | −4.0 |
| Average particle diameter | μm | 100 | 110 | 130 | 80 | 95 | 80 | 80 | 80 | 80 |
| α-Olefin content | mol % | 0 | 0 | 0 | 0.01 | 0 | 0.02 | 0.02 | 0 | 0 |
| Total content of Ti, Al, and Mg | ppm | 1.5 | 28 | 1.0 | 39.0 | 15.0 | 44.0 | 6.0 | 6.0 | 47.0 |
| Degree of release from cooling roll | — | ○ | ○ | ◎ | ◎ | ◎ | ◎ | ◎ | ○ | ◎ |
| Strength of molded body in low-ratio stretching | — | ○ | ○ | ◎ | ○ | ◎ | ○ | ◎ | ◎ | ○ |
| Heat shrinkage rate | — | ○ | ◎ | ◎ | ○ | ○ | ○ | ○ | ◎ | ○ |

TABLE 1-2

| | Unit | Example 10 | Example 11 | Example 12 | Example 13 | Example 14 | Example 15 | Example 16 | Example 17 | Example 18 |
|---|---|---|---|---|---|---|---|---|---|---|
| $\{\eta^*(T_{max}) - \eta^*(T_{min})\}/(T_{max} - T_{min})$ | $10^4$ Pas/°C | −20.0 | −17.0 | −11.0 | −7.7 | −13.8 | −23.0 | −14.2 | −5.7 | −8.4 |
| Viscosity-average molecular weight | 10K | 50 | 90 | 90 | 150 | 180 | 320 | 580 | 900 | 50 |
| Density | kg/m³ | 945 | 940 | 940 | 935 | 930 | 925 | 930 | 920 | 949 |
| Maximum temperature at which $d(\log|\eta^*|)/dT$ is −0.1 or less | °C | 119.6 | 119.1 | 120.6 | 119.1 | 120.2 | 119.5 | 120.4 | 121.2 | 120.1 |
| $\eta^*$ at which value of $d(\log|\eta^*|)/dT$ is minimum value | $10^4$ Pas | 5.8 | 11.0 | 6.7 | 11.8 | 8.7 | 20.5 | 12.0 | 15.0 | 2.8 |
| $0.74\log(Mv) - 8.2$ | — | −4.0 | −3.8 | −3.8 | −3.6 | −3.6 | −3.4 | −3.2 | −3.1 | −4.0 |
| Average particle diameter | μm | 80 | 110 | 100 | 80 | 105 | 75 | 105 | 110 | 80 |
| α-Olefin content | mol % | 0 | 0 | 0 | 0 | 0 | 0 | 0 | 0 | 0 |
| Total content of Ti, Al, and Mg | ppm | 20.0 | 4.0 | 13.0 | 14.0 | 31.0 | 25.0 | 15.0 | 2.0 | 47.0 |
| Degree of release from cooling roll | — | ◎ | ◎ | ◎ | ◎ | ◎ | ○ | ◎ | ○ | ◎ |
| Strength of molded body in low-ratio stretching | — | ◎ | ◎ | ◎ | ○ | ◎ | ◎ | ◎ | ○ | ◎ |
| Heat shrinkage rate | — | ◎ | ◎ | ◎ | ◎ | ◎ | ○ | ○ | ○ | ○ |

TABLE 2

| | Unit | Comparative Example 1 | Comparative Example 2 | Comparative Example 3 | Comparative Example 4 | Comparative Example 5 | Comparative Example 6 |
|---|---|---|---|---|---|---|---|
| $\{\eta^*(T_{max}) - \eta^*(T_{min})\}/(T_{max} - T_{min})$ | $10^4$ Pas/°C | −18.1 | −26.4 | −4.5 | −3.0 | −4.2 | −2.0 |
| Viscosity-average molecular weight | 10K | 15 | 35 | 40 | 50 | 65 | 85 |
| Density | kg/m³ | 940 | 945 | 945 | 950 | 940 | 945 |
| Maximum temperature at which $d(\log|\eta^*|)/dT$ is −0.1 or less | °C | 118.8 | 119.2 | 117.2 | 118.3 | 118.0 | 117.4 |
| $\eta^*$ at which value of $d(\log|\eta^*|)/dT$ is minimum value | $10^4$ Pas | 5.8 | 4.8 | 5.2 | 5.1 | 12.2 | 3.4 |
| $0.74\log(Mv) - 8.2$ | — | −4.4 | −4.1 | −4.1 | −4.0 | −3.9 | −3.8 |
| Average particle diameter | μm | 115 | 80 | 100 | 100 | 110 | 180 |
| α-Olefin content | mol % | 0 | 0 | 0 | 0 | 0.01 | 0 |
| Total content of Ti, Al, and Mg | ppm | 4.0 | 26.0 | 5.2 | 22.0 | 2.4 | 12.0 |

TABLE 2-continued

|  |  |  |  |  |  |  |  |
|---|---|---|---|---|---|---|---|
| Degree of release from cooling roll | — | Δ | Δ | Δ | X | X | X |
| Strength of molded body in low-ratio stretching | — | X | X | X | X | X | X |
| Heat shrinkage rate | — | Δ | X | Δ | Δ | Δ | X |

|  |  | Comparative Example 7 | Comparative Example 8 | Comparative Example 9 | Comparative Example 10 | Comparative Example 11 |
|---|---|---|---|---|---|---|
| | $\{\eta^*(T_{max}) - \eta^*(T_{min})\}/(T_{max} - T_{min})$ | −4.7 | −27.5 | −2.5 | −6.0 | −4.7 |
| | Viscosity-average molecular weight | 350 | 550 | 740 | 1,050 | 85 |
| | Density | 930 | 930 | 930 | 915 | 949 |
| | Maximum temperature at which $d(\log|\eta^*|)/dT$ is −0.1 or less | 118.6 | 118.1 | 117.8 | 120.8 | 117.1 |
| | $\eta^*$ at which value of $d(\log|\eta^*|)/dT$ is minimum value | 4.2 | 13.2 | 18.5 | 13.7 | 3.3 |
| | $0.74\log(Mv) - 8.2$ | −3.4 | −3.2 | −3.1 | −3.0 | −3.8 |
| | Average particle diameter | 90 | 150 | 105 | 80 | 180 |
| | α-Olefin content | 0 | 0 | 0 | 0 | 0 |
| | Total content of Ti, Al, and Mg | 14.1 | 34.0 | 5.5 | 2.1 | 12.0 |
| | Degree of release from cooling roll | X | X | X | Δ | X |
| | Strength of molded body in low-ratio stretching | Δ | Δ | X | Δ | X |
| | Heat shrinkage rate | X | X | Δ | X | X |

The polyethylene powders of the Examples had the entanglement of polyethylene molecular chains strong enough to exhibit a nucleating agent effect, and molded bodies having high mechanical strength even in low-ratio stretching were produced from the polyethylene powders of the Examples.

Furthermore, the polyethylene powders of the Examples had a fast crystallization rate, and the resulting gel sheets were easily released from a cooling roll, particularly, in the microporous membrane production process, and exhibited excellent processability.

Moreover, the polyethylene powders of the Examples lacked the entanglement of molecular chains sufficient for deteriorating the heat shrinkage rate, particularly, in microporous membranes. Owing to higher strength in low-ratio stretching, the heat shrinkage rate decreased with respect to the strength.

This application claims priority to Japanese Patent Application No. 2021-105354 filed to the Japan Patent Office on Jun. 25, 2021, the contents of which are incorporated herein by reference.

INDUSTRIAL APPLICABILITY

The polyethylene powder of the present invention has industrial applicability as a material for various microporous membranes, a separator for a battery, a high-strength fiber, and the like.

The invention claimed is:

1. A polyethylene powder having a viscosity-average molecular weight of 200,000 or more and 10,000,000 or less, wherein complex viscosity in step 3 under the following Conditions for Measurement of Slurry Viscoelasticity satisfies the following formula (1):

$$-25.0 \times 10^4 \leq \{|\eta^*|(T_{max}) - |\eta^*|(T_{min})\}/(T_{max} - T_{min}) \leq -5.0 \times 10^4 \quad (1)$$

$|\eta^*|(T_{max})$: an absolute value of complex viscosity (Pas) at $T_{max}$
$|\eta^*|(T_{min})$: an absolute value of complex viscosity (Pas) at $T_{min}$
$T_{max}$: maximum temperature (° C.) within a range in which the formula (2) is satisfied
$T_{min}$: minimum temperature (° C.) within a range in which the formula (2) is satisfied:

$$d(\log|\eta^*|)/dT \leq -0.1 \quad (2)$$

$|\eta^*|$: an absolute value of complex viscosity (Pas), T: temperature (° C.)
(Conditions for Measurement of Slurry Viscoelasticity)
measuring apparatus: MARS 11 manufactured by Thermo Fisher Scientific K.K.
stage: 20 mm ϕ
plate: 20 mm ϕ parallel plate
gap: 0.5 mm
slurry composition: 30 parts by mass of a polyethylene powder, 70 parts by mass of a liquid paraffin
polyethylene powder: a powder passing through a sieve having an opening of 425 μm in accordance with a JIS Z 8801 standard is used for measurement
measurement conditions: complex viscosity is measured by the following steps 1 to 3:

step 1 a slurry is kept at 100° C. for 2 min step 2 after the step 1, temperature is increased from 100° C. to 140° C. at 1° C./min (at a frequency of 1 Hz and a strain of 0.1% under a nitrogen atmosphere)

step 3 after the step 2, temperature is decreased from 140° C. to 100° C. at 1° C./min (at a frequency of 1 Hz and a strain of 0.1% under a nitrogen atmosphere), and complex viscosity with respect to temperature change is measured every 0.5° C.

2. The polyethylene powder according to claim 1, wherein the maximum temperature $T_{max}$ within a range in which the formula (2) is satisfied is 118° C. or more and 121° C. or less.

3. The polyethylene powder according to claim 2, wherein the absolute value $|\eta^*|$ of complex viscosity when the value of $d(\log |\eta^*|)/dT$ is a minimum value is $5 \times 10^4$ Pas or more and $20 \times 10^4$ Pas or less.

4. The polyethylene powder according to claim 3, wherein the polyethylene powder has an average particle diameter (D50) of 50 μm or more and 300 μm or less.

5. The polyethylene powder according to claim 3, wherein the polyethylene powder is an ethylene homopolymer.

6. The polyethylene powder according to claim 2, wherein the polyethylene powder has an average particle diameter (D50) of 50 μm or more and 300 μm or less.

7. The polyethylene powder according to claim 6, wherein the polyethylene powder is an ethylene homopolymer.

8. The polyethylene powder according to claim 2, wherein the polyethylene powder is an ethylene homopolymer.

9. The polyethylene powder according to claim 1, wherein the. absolute value $|\eta^*|$ of complex viscosity when the value of $d(\log|\eta^*|)/dT$ is a minimum value is $5 \times 10^4$ Pas or more and $20 \times 10^4$ Pas or less.

10. The polyethylene powder according to claim 9, wherein the polyethylene powder has an average particle diameter (D50) of 50 μm or more and 300 μm or less.

11. The polyethylene powder according to claim 10, wherein the polyethylene powder is an ethylene homopolymer.

12. The polyethylene powder according to claim 9, wherein the polyethylene powder is an ethylene homopolymer.

13. The polyethylene powder according to claim 1, wherein the polyethylene powder has an average particle diameter (D50) of 50 μm or more and 300 μm or less.

14. The polyethylene powder according to claim 13, wherein the polyethylene powder is an ethylene homopolymer.

15. The polyethylene powder according to claim 1, wherein the polyethylene powder is an ethylene homopolymer.

16. The polyethylene powder according to claim 1, wherein a total content of Ti, Al, and Mg is 40 ppm or less.

17. The polyethylene powder according to claim 1, wherein the complex viscosity in step 3 under the Conditions for Measurement of Slurry Viscoelasticity satisfies the following formula (3):

$$\{|\eta^*|(T_{max}) - |\eta^*|(T_{min})\}/(T_{max} - T_{min}) \leq 0.74\log(Mv) - 8.2 \quad (3)$$

wherein Mv represents the viscosity-average molecular weight, $|\eta^*|(T_{max})$: an absolute value of complex viscosity (Pas) at $T_{max}$ if $|\eta^*|(T_{min})$: an absolute value of complex viscosity (Pas) at $T_{min}$ $T_{max}$: maximum temperature (° C.) within a range in which the formula (2) is satisfied $T_{min}$: minimum temperature (° C.) within a range in which the formula (2) is satisfied:

$$d(\log|\eta^*|)/dT \leq -0.1 \quad (2)$$

$|\eta^*|$: an absolute value of complex viscosity (Pas), T: temperature (° C.).

18. A molded body of the polyethylene powder according to claim 1.

19. The molded body according to claim 18, wherein the molded body is a separator for a secondary battery.

20. The molded body according to claim 18, wherein the molded body is a separator for a lithium ion secondary battery.

* * * * *